(12) United States Patent
Aktas et al.

(10) Patent No.: US 12,408,051 B2
(45) Date of Patent: Sep. 2, 2025

(54) RECEIVER SIDE SENSING FOR SIDELINK INTER-UE-COORDINATION

(71) Applicant: QUALCOMM Incorporated, San Diego, CA (US)

(72) Inventors: Tugcan Aktas, La Jolla, CA (US); Seyedkianoush Hosseini, San Diego, CA (US); Tien Viet Nguyen, Bridgewater, NJ (US); Gabi Sarkis, San Diego, CA (US); Sourjya Dutta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 13 days.

(21) Appl. No.: 17/450,433

(22) Filed: Oct. 8, 2021

(65) Prior Publication Data

US 2023/0114379 A1 Apr. 13, 2023

(51) Int. Cl.
| | | |
|---|---|---|
| H04W 24/08 | (2009.01) | |
| H04W 24/02 | (2009.01) | |
| H04W 72/1263 | (2023.01) | |
| H04W 72/25 | (2023.01) | |
| H04W 72/40 | (2023.01) | |
| H04W 74/00 | (2009.01) | |
| H04W 74/0808 | (2024.01) | |
| H04W 92/18 | (2009.01) | |

(52) U.S. Cl.
CPC ....... *H04W 24/08* (2013.01); *H04W 72/1263* (2013.01); *H04W 74/0808* (2013.01)

(58) Field of Classification Search
CPC ............ H04W 24/08; H04W 72/1263; H04W 74/0808
See application file for complete search history.

(56) References Cited

U.S. PATENT DOCUMENTS

| | | | | |
|---|---|---|---|---|
| 10,833,932 B2* | 11/2020 | Phillips | .................. | H04L 45/16 |
| 2015/0249998 A1* | 9/2015 | Long | ....................... | H04L 5/001 |
| | | | | 370/329 |
| 2020/0154440 A1* | 5/2020 | Gholmieh | ......... | H04W 28/0236 |

(Continued)

FOREIGN PATENT DOCUMENTS

| | | |
|---|---|---|
| WO | 2020153998 A1 | 7/2020 |
| WO | 2021148046 A1 | 7/2021 |

OTHER PUBLICATIONS

International Search Report and Written Opinion—PCT/US2022/043236—ISA/EP—Dec. 15, 2022.

(Continued)

*Primary Examiner* — Harry H Kim
(74) *Attorney, Agent, or Firm* — Procopio, Cory, Hargreaves & Savitch LLP/QUALCOMM Incorporated

(57) ABSTRACT

Apparatus, methods, and computer-readable media for facilitating a SL communication for mode 2 resource allocation are disclosed herein. An example method includes performing sensing on one or more SL resources to identify a first set of available resources. The example method further includes adjusting a first measurement threshold to a second measurement threshold based on a size of the first set of available resources being below an availability threshold. The example method further includes transmitting a sidelink message indicating a second set of available resources based on the second measurement threshold.

61 Claims, 13 Drawing Sheets

(56) References Cited

U.S. PATENT DOCUMENTS

| | | | |
|---|---|---|---|
| 2020/0252910 A1* | 8/2020 | Wu | H04B 17/318 |
| 2020/0267523 A1* | 8/2020 | Tang | H04L 5/0064 |
| 2021/0051525 A1* | 2/2021 | Cao | H04W 28/26 |
| 2021/0160817 A1* | 5/2021 | Khoryaev | H04W 72/542 |
| 2022/0232585 A1* | 7/2022 | Park | H04W 72/1263 |
| 2023/0123147 A1* | 4/2023 | Hwang | H04W 72/40 |
| | | | 370/329 |
| 2023/0156669 A1* | 5/2023 | Zhou | H04W 72/02 |
| | | | 370/329 |
| 2023/0262685 A1* | 8/2023 | Panzner | H04W 72/1263 |
| | | | 370/329 |
| 2023/0300858 A1* | 9/2023 | Zhou | H04W 72/25 |
| | | | 370/329 |
| 2023/0319878 A1* | 10/2023 | Hui | H04L 1/1854 |
| | | | 370/329 |
| 2023/0389002 A1* | 11/2023 | Hui | H04L 5/0064 |

OTHER PUBLICATIONS

3GPP TS 38.214: "3rd Generation Partnership Project, Technical Specification Group Radio Access Network, NR, Physical Layer Procedures for Data (Release 16)", 3GPP TS 38.214, V16.7.0, Sep. 2021, 6 Pages, Section 8.1.4.

* cited by examiner

RECEIVER SIDE SENSING FOR SIDELINK INTER-UE-COORDINATION

INTRODUCTION

The present disclosure relates generally to communication systems, and more particularly, to wireless communication utilizing sidelink (SL) communication between user equipments (UEs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may include direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a first UE is provided. The method may include performing sensing on one or more SL resources to identify a first set of available resources. The example method may also include adjusting a first measurement threshold to a second measurement threshold based on a size of the first set of available resources being below an availability threshold. The example method may also include transmitting a sidelink message indicating a second set of available resources based on the second measurement threshold.

In another aspect of the disclosure, an apparatus for wireless communication is provided. The apparatus may be a UE that includes a memory and at least one processor coupled to the memory, the memory and the at least one processor configured to perform sensing on one or more SL resources to identify a first set of available resources. The memory and the at least one processor may also be configured to adjust a first measurement threshold to a second measurement threshold based on a size of the first set of available resources being below an availability threshold. The memory and the at least one processor may also be configured to transmit a sidelink message indicating a second set of available resources based on the second measurement threshold.

In another aspect of the disclosure, an apparatus for wireless communication at a wireless device is provided. The apparatus may include means for performing sensing on one or more SL resources to identify a first set of available resources. The example apparatus may also include means for adjusting a first measurement threshold to a second measurement threshold based on a size of the first set of available resources being below an availability threshold. The example apparatus may also include means for transmitting a sidelink message indicating a second set of available resources based on the second measurement threshold.

In another aspect of the disclosure, a non-transitory computer-readable storage medium storing computer executable code for wireless communication at a wireless device is provided. The code, when executed, may cause a processor to perform sensing on one or more SL resources to identify a first set of available resources. The example code, when executed, may also cause the processor to adjust a first measurement threshold to a second measurement threshold based on a size of the first set of available resources being below an availability threshold. The example code, when executed, may also cause the processor to transmit a sidelink message indicating a second set of available resources based on the second measurement threshold.

In an aspect of the disclosure, a method of wireless communication at a first UE is provided. The method may include performing a sensing measurement on one or more SL resources to determine one or more available resources for sidelink communication. The example method may also include transmitting a sidelink message including a resource availability report indicating a subset of the one or more available resources.

In another aspect of the disclosure, an apparatus for wireless communication is provided. The apparatus may be a first UE that includes a memory and at least one processor coupled to the memory, the memory and the at least one processor configured to perform a sensing measurement on one or more SL resources to determine one or more available resources for sidelink communication. The memory and the at least one processor may also be configured to transmit a sidelink message including a resource availability report indicating a subset of the one or more available resources.

In another aspect of the disclosure, an apparatus for wireless communication at a first UE is provided. The apparatus may include means for performing a sensing measurement on one or more SL resources to determine one or more available resources for sidelink communication. The example apparatus may also include means for transmitting a sidelink message including a resource availability report indicating a subset of the one or more available resources.

In another aspect of the disclosure, a non-transitory computer-readable storage medium storing computer executable code for wireless communication at a first UE is provided. The code, when executed, may cause a processor to perform a sensing measurement on one or more SL resources to determine one or more available resources for sidelink communication. The example code, when executed, may also cause the processor to transmit a sidelink message including a resource availability report indicating a subset of the one or more available resources.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
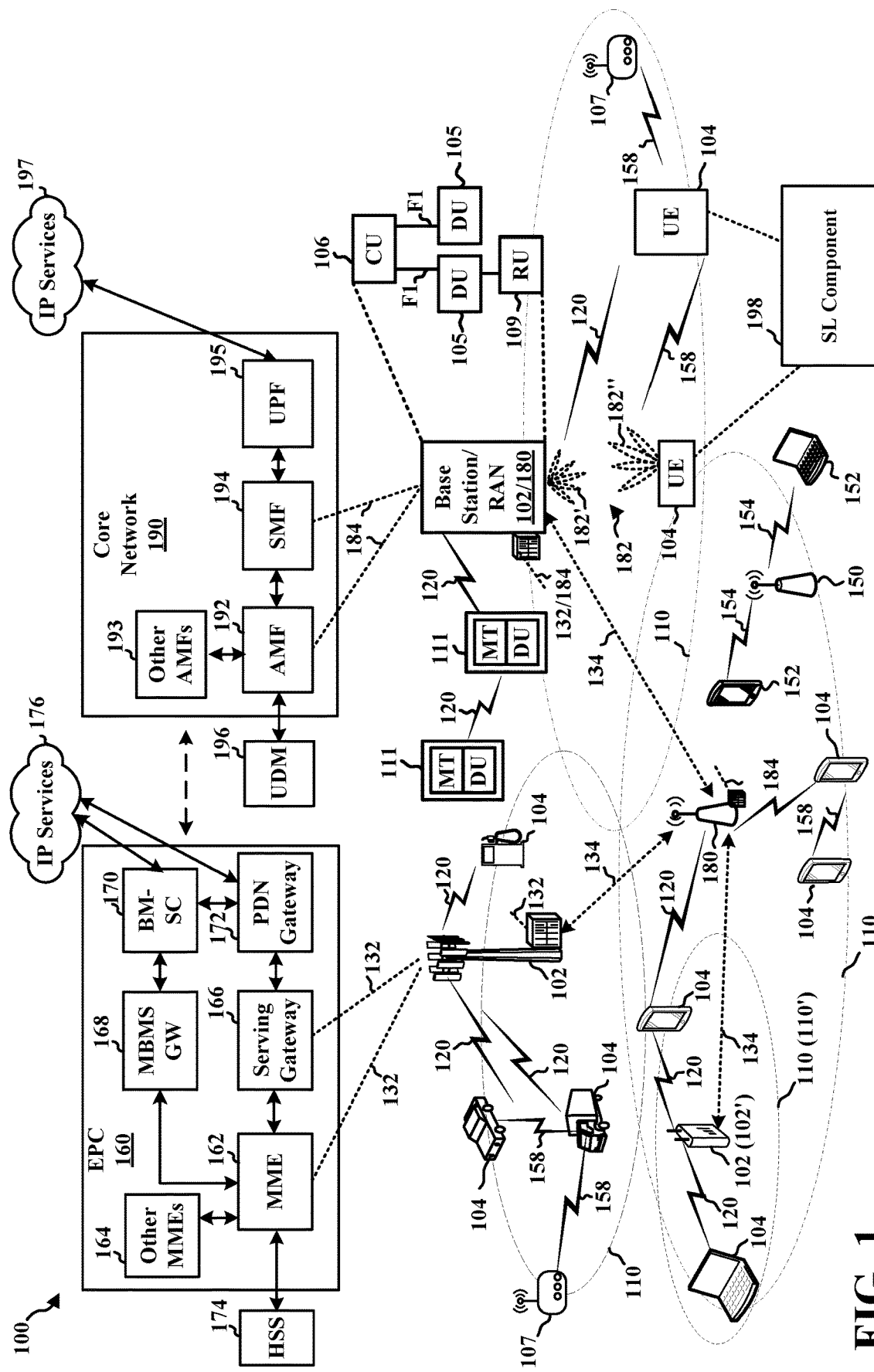
FIG. 1 is a diagram illustrating an example of a wireless communications system and an access network.

Sidelink communication enables a first UE to communicate with another UE directly. Sidelink communication may be based on different types or modes of resource allocation mechanisms. In a first resource allocation mode (which may be referred to herein as "Mode 1"), centralized resource allocation may be provided by a network entity. In a second resource allocation mode (which may be referred to herein as "Mode 2"), distributed resource allocation may be provided. In Mode 2 resource allocation, each UE may autono-mously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are reserved, or used, by other devices in order to avoid a selection of colliding (e.g., overlapping in time and/or frequency) transmission resources.

Thus, in the second mode (e.g., Mode 2), individual UEs may autonomously select resources for sidelink transmission, e.g., without a central entity such as a base station indicating the resources for the device. The UE may receive various types of information that may be used for sidelink resource selection. To reduce or avoid resource collisions under such instances, and to improve sidelink communication among UEs, the UEs may coordinate among themselves by generating and sharing inter-UE coordination information with other UEs. As an example, a first UE may generate inter-UE coordination information indicating preferred resources, non-preferred resources, or resource conflict information. A second UE may receive inter-UE coordination information from the first UE and may accordingly avoid using the non-preferred resources when communicating with the first UE. In some aspects, the second UE may include an inter-UE coordination information associated with the second UE based on reservation information (e.g., information indicating time and frequency resources reserved for a particular sidelink transmission) or inter-UE coordination information received from the first UE (or other UEs) when transmitting its own resource reservation.

As an example, a receiving UE may perform sensing, then inform the transmitting UE (along with other UEs) about the resources that are available for transmission based on the sensing result. For example, the receiving UE may be a smartphone with a higher processing power and higher battery capacity than the transmitting UE, which may be a smartwatch with limited battery capacity and limited processing power. In such an example, it may be more efficient to have the higher processing power receiving UE with higher battery capacity perform the sensing for the transmitting UE.

In some circumstances, based on the sensing, the receiving UE may identify a first set of available resources that may be smaller than a threshold amount of available resources (e.g., by comparing a size of the available resources with an availability threshold) for a transmission by the transmitting UE. Aspects provided herein enable a receiving UE to adjust one or more parameters, such as a measurement threshold, when identifying a set of available resources that may be suitable for a transmission by the transmitting UE. By enabling the receiving UE to adjust the parameters for identifying available resources, e.g., by adjusting a measurement threshold, the receiving UE may indicate a more consistent amount of available resources for the transmitting UE. The added consistency in the amount of available resources reported by the receiving UE may provide the transmitting UE with information of a set of available resources that may be more suitable for the transmission.

As used herein, the term "sensing" may refer to a procedure where a UE performs one or more measurements (which may be referred to as "sensing measurements") to identify resources that are available for sidelink transmissions for the UE or another UE. By way of example, sensing measurements may include reference signal received power (RSRP) measurements, reference signal received quality (RSRQ) measurements, signal to interference ratio (SIR) measurements, or the like. A UE may compare sensing measurements associated with a resource with a threshold (which may be referred to as "measurement threshold"). If the sensing measurement associated with the resource is below the measurement threshold, the UE may determine that the resource is available. In another example, if the sensing measurement associated with the resource is above the measurement threshold, the UE may determine that the resource is available. As used herein, the term "inter-UE coordination information" may refer to information exchanged between sidelink UEs to facilitate sidelink communications under resource allocation Mode 2 where each UE may autonomously determine resources to use for sidelink transmission.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink k communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 2. In some examples, an intermediary device (e.g., such as a base station 102 or 180) may facilitate communication between an originating device (e.g., a first UE) and a target device (e.g., a second UE) using sidelink communication. For example, a base station may allocate resources for sidelink communication, in some examples. In other examples, the devices may communicate without assistance from an intermediary device.

Figure 2:
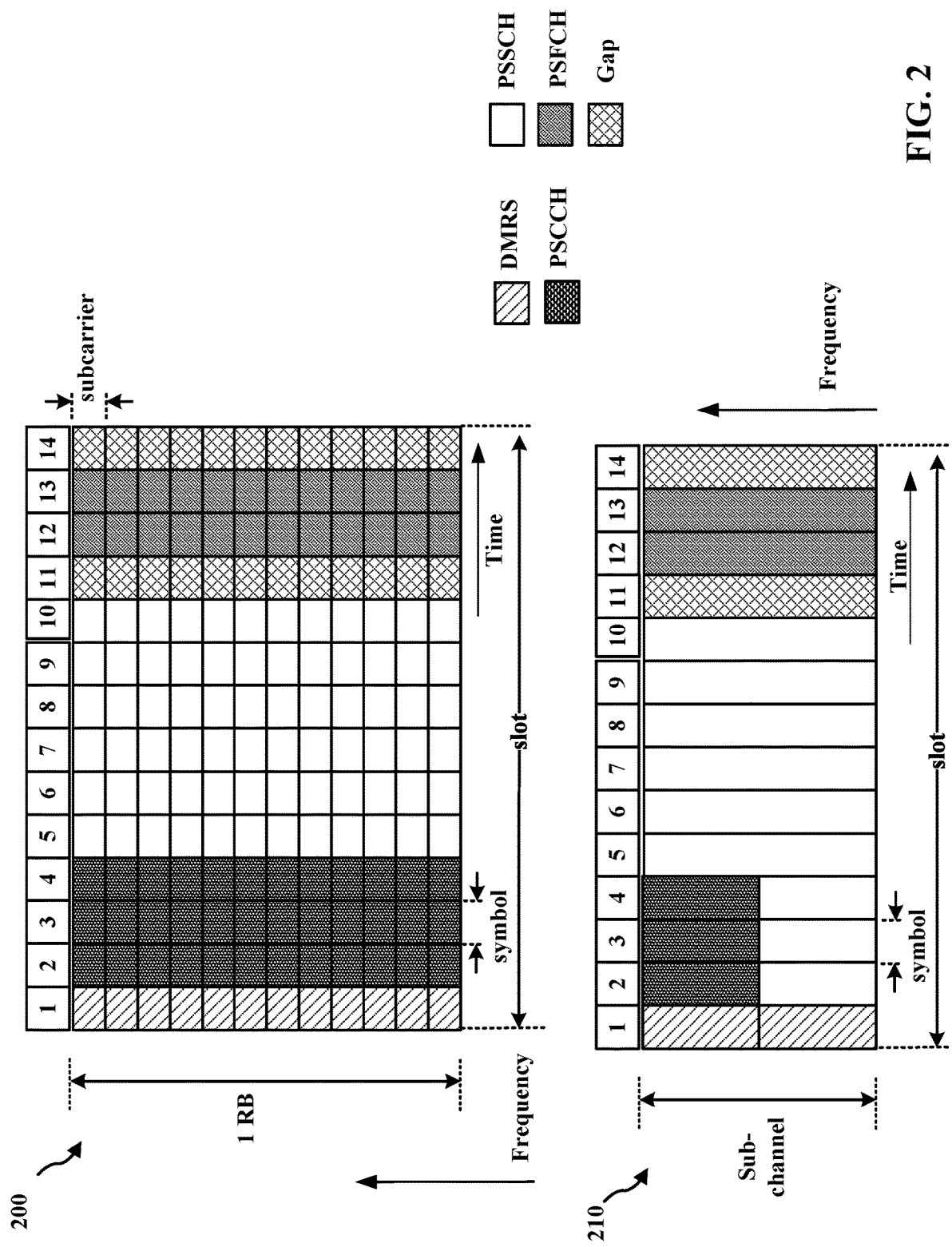
FIG. 2 illustrates example aspects of a sidelink slot structure.

Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in some aspects, a sidelink communication device, such as the UE 104, may be configured to manage one or more aspects of wireless communication by facilitating resource reservation for UEs applying a power saving mode. As an example, in FIG. 1, the UE 104 may include a SL component 198 configured to perform sensing on one or more SL resources to identify a first set of available resources. The SL component 198 may also be configured to adjust a first measurement threshold to a second measurement threshold based on a size of the first set of available resources being below an availability threshold. The SL component 198 may also be configured to transmit a sidelink message indicating a second set of available resources based on the second measurement threshold. The SL component 198 may also be configured to perform a sensing measurement on one or more SL resources to determine one or more available resources for sidelink communication. The SL component 198 may also be configured to transmit a sidelink message including a resource availability report indicating a subset of the one or more available resources.

Although the following description provides examples directed to 5G NR (and, in particular, to sidelink communications via 5G NR), the concepts described herein may be applicable to other similar areas, such as LTE, LTE-A, CDMA, GSM, and/or other wireless technologies, in which wireless communication devices may employ power saving modes and perform resource reservations.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., SI interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184 (e.g., an Xn interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or adjust capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2 includes diagrams 200 and 210 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 2 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols may be CP orthogonal frequency division multiplexing (OFDM) (CP-OFDM) symbols. The symbols may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ "0" to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and 2 slots/subframe. The subcarrier spacing may be equal to $2^\mu*15$ kHz, where u is the numerology "0" to 4. As such, the numerology μ=0 has a subcarrier spacing of 15 kHz and the numerology μ=4 has a subcarrier spacing of 240 kHz. The symbol length/duration is inversely related to the subcarrier spacing. FIG. 2 provides an example of normal CP with 14 symbols per slot. Within a set of frames, there may be one or more different bandwidth parts (BWPs) that are frequency division multiplexed. Each BWP may have a particular numerology and CP (normal or extended).

Diagram 200 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may comprise 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 210 in FIG. 2 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 2, some of the REs may include control information in PSCCH and some REs may include demodulation RS (DMRS). At least one symbol may be used for feedback. FIG. 2 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may comprise the data message described herein. The position of any of the data, DMRS, SCI, feedback, gap symbols, and/or LBT symbols may be different than the example illustrated in FIG. 2. Multiple slots may be aggregated together in some aspects.

Figure 3:
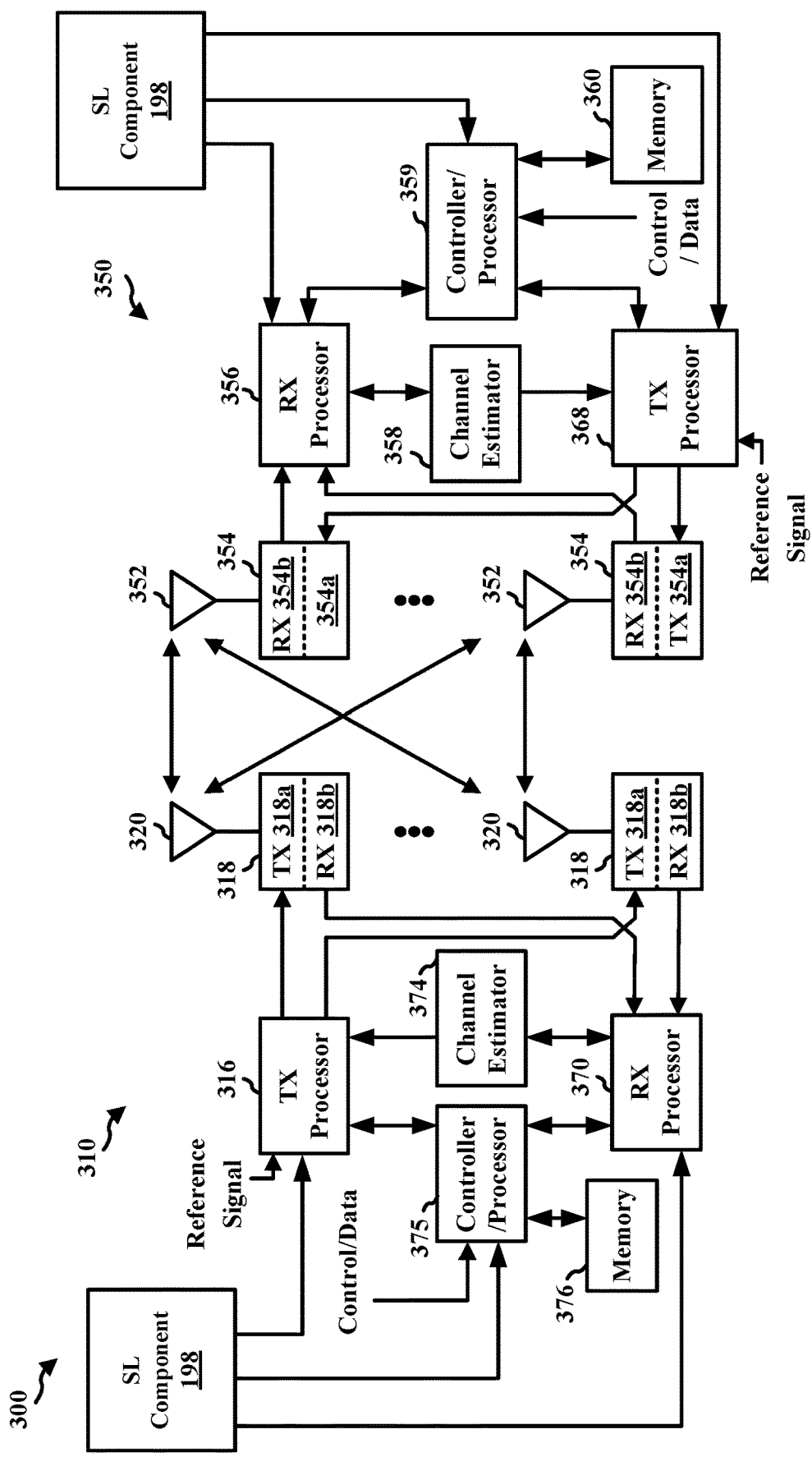
FIG. 3 is a diagram illustrating an example of a first device and a second device involved in wireless communication based, e.g., on sidelink.

FIG. 3 is a block diagram 300 of a first wireless communication device 310 in communication with a second wireless communication device 350. The communication may be based on sidelink or an access link. In some examples, the wireless communication devices 310, 350 may communicate based on V2X or other D2D communication. In other aspects, the wireless communication devices 310, 350 may communicate over an access link based on uplink and downlink transmissions. The communication may be based on sidelink using a PC5 interface (e.g., between two UEs). The communication may be based on an access link using a Uu interface (e.g., between a base station and a UE). The wireless communication devices 310, 350 may comprise a UE, an RSU, a base station, etc. In some implementations, the first wireless communication device 310 may correspond to a base station and the second wireless communication device 350 may correspond to a UE.

As shown in FIG. 3, the first wireless communication device 310 includes a transmit processor (TX processor 316), a transceiver 318 including a transmitter 318a and a receiver 318b, antennas 320, a receive processor (RX processor 370), a channel estimator 374, a controller/processor 375, and memory 376. The example second wireless communication device 350 includes antennas 352, a transceiver 354 including a transmitter 354a and a receiver 354b, an RX processor 356, a channel estimator 358, a controller/processor 359, memory 360, and a TX processor 368. In other examples, the first wireless communication device 310 and/or the second wireless communication device 350 may include additional or alternative components.

Packets may be provided to the controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The TX processor 316 and the RX processor 370 implement layer "1" functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from the channel estimator 374 may be used to determine the coding and modulation scheme, as well as for spatial processing. The channel estimate may be derived from a reference signal and/or channel condition feedback transmitted by the second wireless communication device 350. Each spatial stream may then be provided to a different antenna 320 via a separate transmitter 318a. Each transmitter 318a may modulate a radio frequency (RF) carrier with a respective spatial stream for transmission.

At the second wireless communication device 350, each receiver 354b receives a signal through its respective antenna 352. Each receiver 354b recovers information modulated onto an RF carrier and provides the information to the RX processor 356. The TX processor 368 and the RX processor 356 implement layer "1" functionality associated with various signal processing functions. The RX processor 356 may perform spatial processing on the information to recover any spatial streams destined for the second wireless communication device 350. If multiple spatial streams are destined for the second wireless communication device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the first wireless communication device 310. These soft decisions may be based on channel estimates computed by the channel estimator 358. The soft decisions are then decoded and deinterleaved to recover the data and control signals that were originally transmitted by the first wireless communication device 310 on the physical channel. The data and control signals are then provided to the controller/processor 359, which implements layer 3 and layer 2 functionality.

The controller/processor 359 can be associated with the memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an acknowledgment (ACK) and/or negative ACK (NACK) protocol to support hybrid automatic repeat request HARQ operations.

Similar to the functionality described in connection with the transmission by the first wireless communication device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the first wireless communication device 310 may be used by the TX processor 368 to select the appropriate coding and modulation schemes, and to facilitate spatial processing. The spatial streams generated by the TX processor 368 may be provided to different antenna 352 via separate transmitters 354a. Each transmitter 354a may modulate an RF carrier with a respective spatial stream for transmission.

The transmission is processed at the first wireless communication device 310 in a manner similar to that described in connection with the receiver function at the second wireless communication device 350. Each receiver 318b receives a signal through its respective antenna 320. Each receiver 318b recovers information modulated onto an RF carrier and provides the information to the RX processor 370.

The controller/processor 375 can be associated with the memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368 or the TX processor 316, the RX processor 356 or the RX processor 370, and the controller/processor 359 or the controller/processor 375 may be configured to perform aspects in connection with the SL component 198 of FIG. 1.

Figure 4:
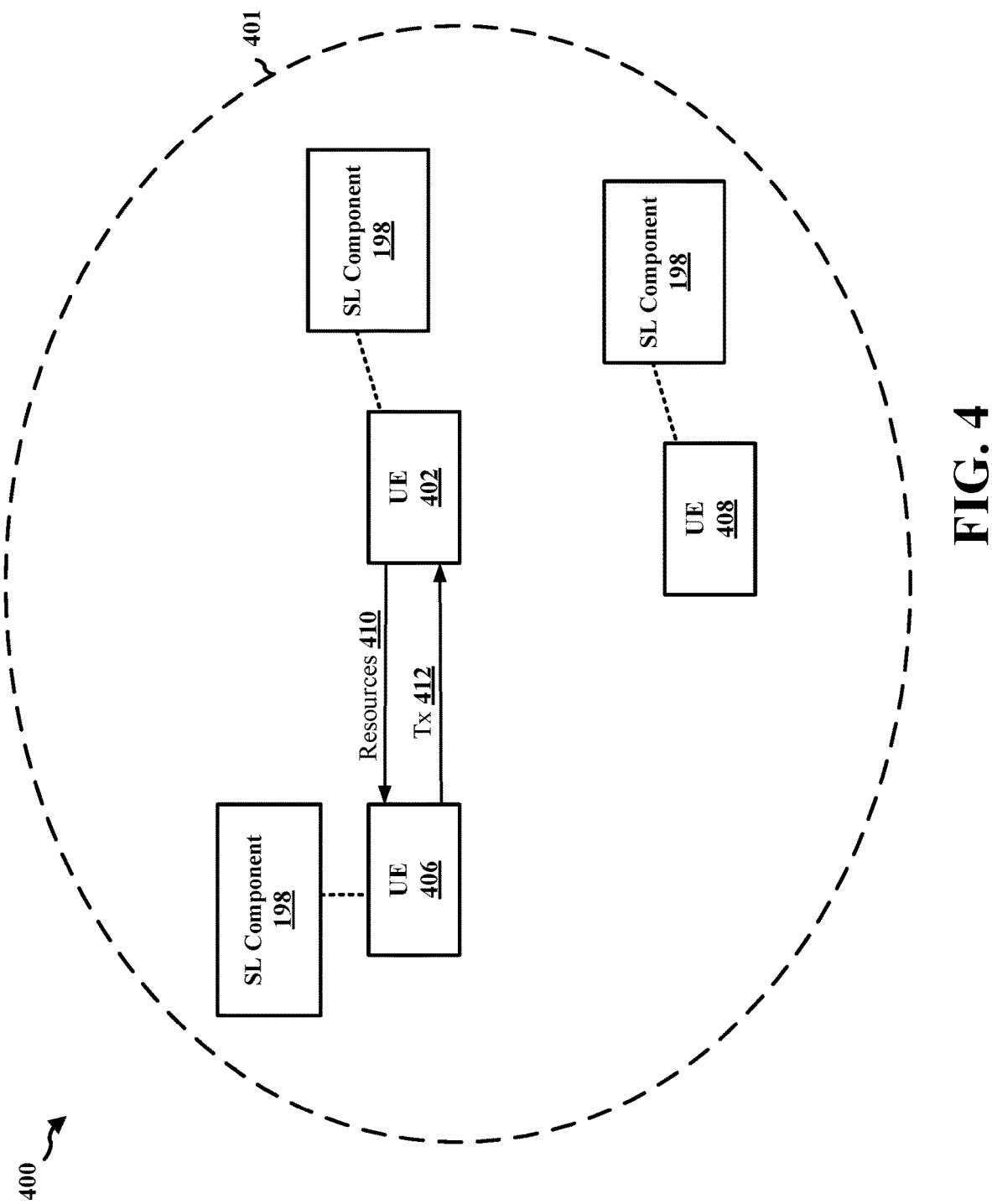
FIG. 4 illustrates example aspects of sidelink communication between devices, in accordance with aspects presented herein.

FIG. 4 illustrates an example 400 of sidelink communication between devices, as presented herein. The communication may be based on a slot structure including aspects described in connection with FIG. 2 or another sidelink structure. For example, a first UE 402 may transmit a sidelink transmission 410, e.g., including a control channel (e.g., PSCCH) and/or a corresponding data channel (e.g., PSSCH), that may be received by a second UE 406 and/or a third UE 408. The sidelink transmission 410 may be received directly from the first UE 402, e.g., without being transmitting through a base station.

The first UE 402, the second UE 406, and/or the third UE 408 may each be capable of operating as a transmitting device in addition to operating as a receiving device. Thus, the second UE 406 is illustrated as transmitting a sidelink transmission 412 that is received by the first UE 402. One or more of the sidelink transmissions 410, 412 may be broadcast or multicast to nearby devices. For example, the first UE 402 may transmit communications intended for receipt by other UEs within a range 401 of the first UE 402. In other examples, one or more of the sidelink transmissions 410, 412 may be groupcast to nearby devices that are a member of a group. In other examples, one or more of the sidelink transmissions 410, 412 may be unicast from one UE to another UE.

A sidelink transmission may provide sidelink control information (SCI) including information to facilitate decoding the corresponding data channel. For example, a transmitting device (sometimes referred to as an "originating device," a "transmitting UE", or an "originating UE") may transmit SCI including information that a receiving device (sometimes referred to as a "target device," a "receiving UE," or a "target UE") may use to avoid interference. For example, the SCI may indicate reserved time resources and/or reserved frequency resources that will be occupied by the data transmission, and may be indicated in a control message from the transmitting device. The number of TTIs, as well as the RBs that will be occupied by the data transmission, may be indicated in a control message from the first UE 402. In some examples, the SCI may be used by a receiving device to avoid interference by refraining from transmitting on the occupied resources during a data transmission.

One or more of the first UE 402, the second UE 406, and/or the third UE 408 may include an SL component, similar to the SL component 198 described in connection with FIG. 1.

Sidelink communication enables a first UE to communicate with another UE directly. For example, the first UE and the other UE may communicate without routing the communication through a base station. Sidelink may be beneficial for vehicle-based communications (e.g., V2V, V2I, V2N, V2P, C-V2X, etc.) that allows a vehicle UE to communicate directly with another UE or a pedestrian UE. When dealing with V2X communication, power consumption by the vehicle UE might not be a concern.

However, it may be beneficial to implement power saving modes for some devices. Two examples of power saving modes include partial sensing or random selection and discontinuous reception (DRX). In either DRX or partial sensing, the UE may skip sensing for resource reservations for portions of time. The skipped sensing may save battery power at the UE, for example.

Sidelink communication may be based on different types or modes of resource allocation mechanisms. In a first resource allocation mode (which may be referred to herein as "Mode 1"), centralized resource allocation may be provided by a network entity. For example, and referring to the example of FIG. 1, a base station 102/180 may determine resources for sidelink communication and may allocate resources to different UEs to use for sidelink transmissions. In this first mode, a UE receives the allocation of sidelink resources from the base station 102/180. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink may determine one or more radio resources in the time and frequency domain that are used by other devices in order to select transmission resources that avoid collisions with other devices. The sidelink transmission and/or the resource reservation may be periodic or aperiodic, where a UE may reserve resources for transmission in a current slot and up to two future slots.

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation Mode 2, the UE may determine (e.g., sense) whether a selected sidelink resource has been reserved by other UE(s) before selecting the sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field included in the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

Figure 5:
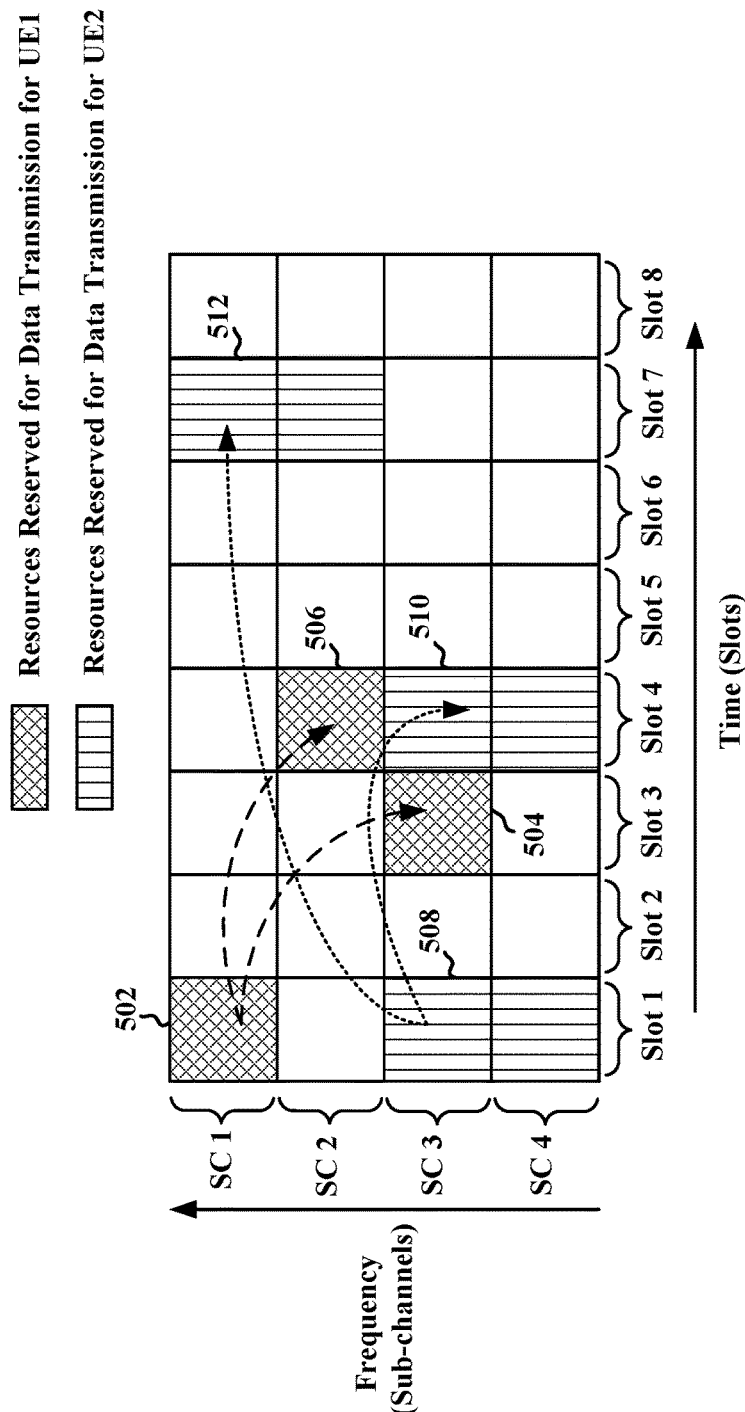
FIG. 5 illustrates examples of resource reservation for sidelink communication.

FIG. 5 is an example 500 of time and frequency resources showing reservations for sidelink transmissions, as presented herein. The resources may be included in a sidelink resource pool, for example. The resource allocation for each UE may be in units of one or more sub-channels in the frequency domain (e.g., sub-channels SC1 to SC 4), and may be based on one slot in the time domain (e.g., slots "1" to 8). The UE may also use resources in the current slot to perform an initial transmission, and may reserve resources in future slots for retransmissions. In the illustrated example of FIG. 5, two different future slots are being reserved by UE1 and UE2 for retransmissions. The resource reservation may be limited to a window of a pre-defined slots and sub-channels, such as an 8 time slots by 4 sub-channels window as shown in example 500, which provides 32 available resource blocks in total. This window may also be referred to as a resource selection window.

A first UE ("UE1") may reserve a sub-channel (e.g., SC 1) in a current slot (e.g., slot 1) for its initial data transmission 502, and may reserve additional future slots within the window for data retransmissions (e.g., a first data retransmission 504 and a second data retransmission 506). For example, the first UE may reserve sub-channels SC 3 at slot 3 and SC 2 at slot 4 for future retransmissions as shown by FIG. 5. The first UE then transmits information regarding which resources are being used and/or reserved by it to other UE(s). The first UE may do so by including the reservation information in a reservation resource field of the SCI, e.g., a first stage SCI.

FIG. 5 illustrates that a second UE ("UE2") reserves resources in sub-channels SC 3 and SC 4 at slot "1" for a current data transmission 508, reserves a first data retransmission 510 at slot 4 using sub-channels SC 3 and SC 4, and reserves a second data retransmission 512 at slot 7 using sub-channels SC "1" and SC 2, as shown by FIG. 5. Similarly, the second UE may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 5 illustrates resources being reserved for an initial transmission and two retransmissions, the reservation may be for an initial transmission and a single transmission or only for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, the UE may determine a set of candidate resources (e.g., by monitoring SCI from other UEs and removing resources from the set of candidate resources that are reserved by other UEs in a signal for which the UE measures an RSRP above a threshold value). The UE may also select N resources for transmissions and/or retransmissions of a TB. As an example, the UE may randomly select the N resources from the set of candidate resources previously determined. For each transmission, the UE may reserve future time and frequency resources for an initial transmission and up to two retransmissions. The UE may reserve the resources by transmitting SCI indicating the resource reservation. For example, in the example in FIG. 5, the second UE may transmit SCI reserving resources for the current data transmission 508, the first data retransmission 510, and the second data retransmission 512.

There may be a timeline for a sensing-based resource selection. For example, the UE may sense and decode the SCI received from other UEs during a sensing window, e.g., a time duration prior to resource selection. Based on the sensing history during the sensing window, the UE may be able to maintain a set of available candidate resources by excluding resources that are reserved by other UEs from the set of candidate resources. A UE may select resources from its set of available candidate resources and transmits SCI reserving the selected resources for sidelink transmission (e.g., a PSSCH transmission) by the UE. There may be a time gap between the UE's selection of the resources and the UE transmitting SCI reserving the resources.

Figure 6:
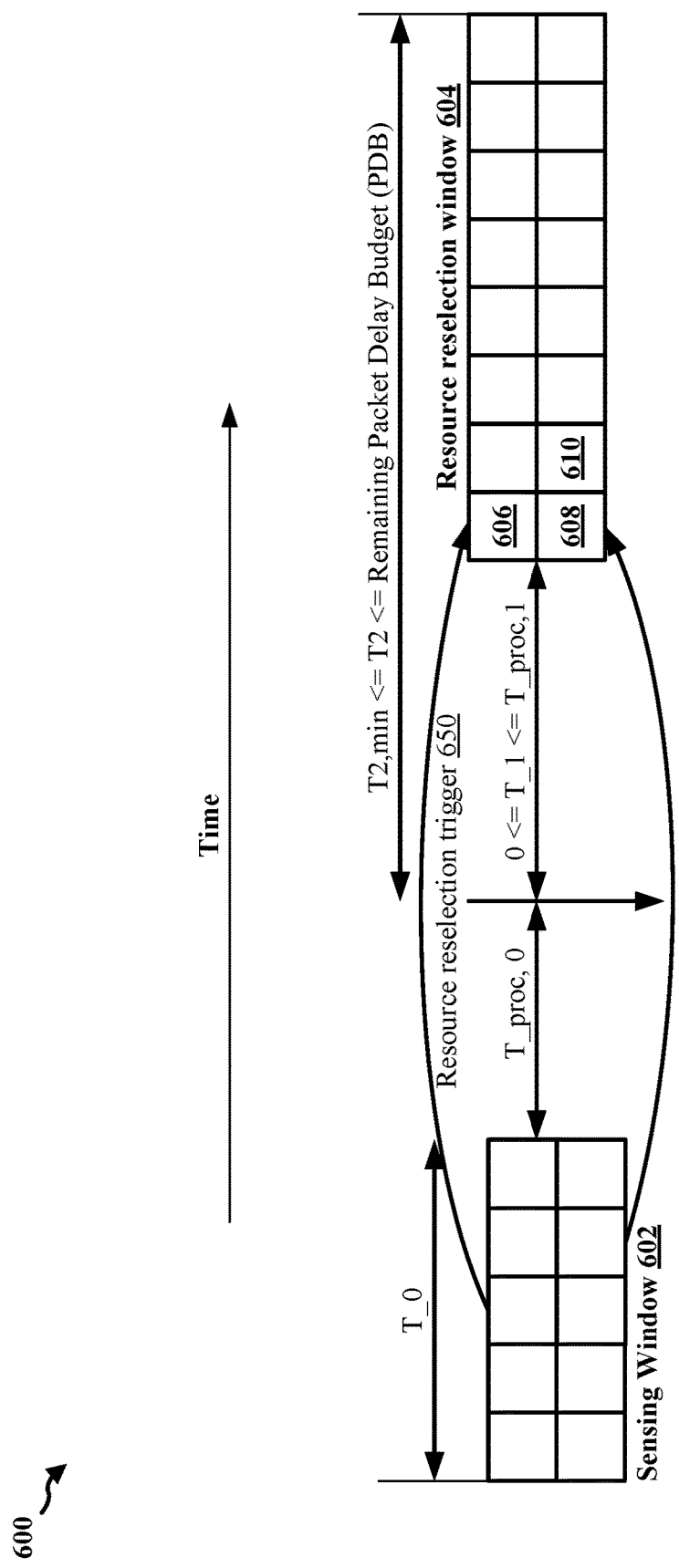
FIG. 6 is a diagram illustrating a timing diagram for a UE employing a sensing mechanism.

In the resource allocation Mode 2, a higher layer may request the UE 104 that includes the SL component 198 to determine a subset of resources from which the higher layer may select resources for PSSCH/PSCCH transmissions. FIG. 6 illustrates an example timing diagram 600 for a UE that may be triggered to select a resource for sidelink transmission in response to a resource selection trigger 650. The timing diagram shows a timing for sensing for resource reservations from other UEs, such as the resource reservations described in connection with FIG. 5. As an example, the resource selection trigger 650 may include having data for transmission. Although FIG. 6 is described in connection with a UE, the resource selection may also be applied by other sidelink devices. In response to the resource selection trigger 650, the UE may consider signals received within a sensing window 602 of duration T_0 and determine information (e.g., SCI with resource reservations) received within the sensing window 602. For example, the UE may determine which resources were used by other UE(s) or reserved by other UE(s) during the sensing window 602. The UE may anticipate that the previously used resources may also be used by the other UE in the future. A signal received in the sensing window may include SCI indicating a resource reservation for a resource within the resource selection window 604 following the resource selection trigger 650. Based on the past use of resources and/or the reservation of resources (e.g., the "sensing" of resources), the UE may determine which resources are scheduled for use and/or determine which resources are not scheduled for use. For example, based on the sensing of the resources during the sensing window 602, the UE may determine that a first resource 606 and a second resource 608 may be reserved during the slot associated with the resource selection trigger 650 and/or during a future slot. The UE may exclude candidate resources that are reserved by other UEs from a candidate set of resources when selecting a sidelink transmission resource. In some examples, the UE may exclude candidate resources that are reserved by another UE and that meet one or more conditions, such as the reservation signal meeting an RSRP threshold. The UE may select resource 610 for a transmission.

In some wireless communication systems, a receiving UE may perform sensing, then inform the transmitting UE (along with other UEs) about the resources that are available for transmission based on the sensing result. For example, the receiving UE may be a smartphone with a higher processing power and higher battery capacity than the transmitting UE, which may be a smartwatch with limited battery capacity and limited processing power. Therefore, it may be more efficient to have the higher processing power with higher battery capacity receiving UE to perform the sensing for the transmitting UE.

In some instances, multiple UEs may transmit at the same time and may not receive the overlapping communication (e.g., SCI indicating resource reservations) from each other and/or from a base station. Such a UE may miss or be unaware of transmissions and sidelink reservations by other UEs. Therefore, two UEs may reserve the same resource block for a future sidelink transmission, which may result in a resource collision. A resource collision occurs for sidelink transmissions that overlap at least partially in time, and which may overlap, at least partially, in frequency.

Figure 7A:
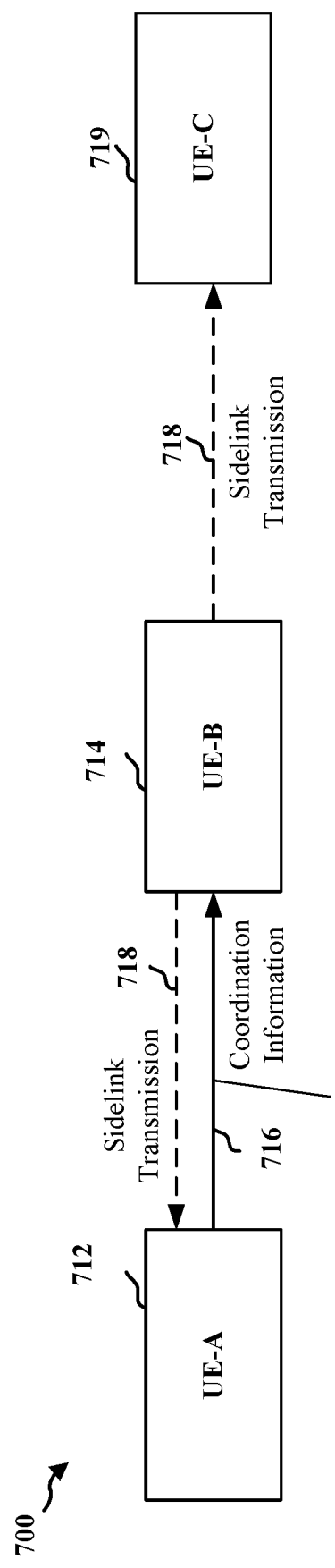
FIGS. 7A and 7B are diagrams illustrating inter UE coordination between UEs, in accordance with the teachings disclosed herein.

To reduce or avoid resource collisions under such instances, and to improve sidelink communication among UEs, the UEs may coordinate among themselves by generating and sharing inter-UE coordination information with other UEs. FIG. 7A is a diagram 700 illustrating the exchange of inter-UE coordination information, where a first UE ("UE-A") 712 transmits inter-UE coordination information 716 to a second UE ("UE-B") 714. In some aspects, the transmission of inter-UE coordination information may include resource reservation forwarding by the UE-A.

The inter-UE coordination information 716 may include information based on the UE's sensing information (e.g., resource reservations of other UEs that are sensed by UE 712 (e.g., UE-A)), inter-UE coordination information from another UE, resources that are bad, undesirable, or non-preferred for the UE-A 712 (e.g., resources subject to high interference), resources which are preferred or better than other resources for the UE-A 712, etc.

The inter-UE coordination information 716 may indicate candidate resources for sidelink transmission or preferred resources for transmissions by UE-B 714. In some aspects, the indication of preferred resources for UE-B's transmission may be referred to as "Type A" inter-UE coordination information. The UE-A 712 may use the inter-UE coordination information 716 to inform the UE-B 714 about which sub-channels and slots may be used for communicating with the UE-A 712 and/or which sub-channels and slots may not be used because they are occupied or reserved by the UE-A 712 and/or other UEs. The UE-A may indicate a set of resources that may be more suitable for UE-B's transmission based on UE-A's evaluation. The candidate resources may indicate a group of resources from which the UE-B 714 (e.g., UE-B) may select for the sidelink transmission 718. As illustrated, the sidelink transmission 718 may be for UE-A 712 or for one or more different UEs, e.g., UE-C 719. In some aspects, the UE-A may be a potential receiver of the UE-B's transmission, and the inter-UE coordination information may enable mode 2 resource allocation that is based on resource availability from a potential receiver's perspective, which may address reception challenges for a hidden node. In some aspects, the inter-UE coordination information 716 may indicate resources for a sidelink transmission, e.g., particular resources on which the UE-B 714 is to transmit the sidelink transmission 718 rather than candidate resources that the UE-B 714 may select.

In some aspects, the inter-UE coordination information 716 may indicate a set of resources that may not be preferred for UE-B's transmission, such as resources that may not be available for UE-B to transmit a sidelink transmission based on the UE-A's evaluation. In some aspects, the indication of non-preferred resources for UE-B's transmission may be referred to as "Type B" inter-UE coordination information.

In some aspects, the inter-UE coordination information 716 may indicate a half-duplex conflict. For example, the inter-UE coordination information 716 may indicate a collision in time and/or frequency for two transmitting UEs that are unable to receive the other, respective transmission in a half-duplex mode. In some aspects, the inter-UE coordination information 716 may indicate a collision of resources (e.g., reserved resources) in time and/or frequency. In some aspects, the indication of a collision/conflict in resources may be referred to as "Type C" inter-UE coordination information.

Based at least in part on the inter-UE coordination information 716 from the UE-A 712, the UE-B 704 may make a better decision on which resources to use and/or reserve for its sidelink transmission 718 to avoid resource collisions. The UE-A 712 may share its inter-UE coordination information 716 with multiple UEs, and the UE-B 714 may receive the inter-UE coordination information 716 from multiple UEs. Inter-UE coordination information 716 may be transmitted in any of various ways.

The UE-A 712 may transmit inter-UE coordination information 716 in a PSFCH, e.g., indicating a resource collision or a half-duplex conflict indication. The UE-A 712 may transmit inter-UE coordination information 716 in SCI. For example, the UE-A 712 may transmit shared sensing information, candidate resource information for a sidelink transmission, or particular resources for a sidelink transmission in SCI-2 transmitted in PSSCH. For example, a first portion of SCI (e.g., SCI-1) may be transmitted in PSCCH, and a second portion of SCI (e.g., SCI-2) may be transmitted in PSSCH. The UE-A 712 may transmit inter-UE coordination information 716 in a MAC-CE, e.g., on the PSSCH. The UE-A 712 may transmit the inter-UE coordination information 716 in a new physical channel (e.g., that is different than PSCCH, PSSCH, PSFCH, etc.). For example, the UE-A 712 may transmit the inter-UE coordination information 716 in a physical channel that is configured for or dedicated to inter-UE configuration information. The UE-A 712 may transmit the inter-UE coordination information 716 in RRC signaling.

In some aspects, the UE-A 712 may transmit the inter-UE coordination information 716 periodically. In some aspects, the UE-A 712 may transmit aperiodic inter-UE coordination information 716 in response to a trigger. Among other examples, the trigger may be based on the occurrence of an event, such as the occurrence of/detection of a resource collision, the occurrence of/detection of a half-duplex conflict, etc. For example, if the UE-A 712 detects a resource collision, the UE-A 712 may respond by transmitting inter-UE coordination information 716.

The UE-B 714 may utilize the inter-UE coordination information 716 in various ways.

If the inter-UE coordination information 716 includes information about resources that are preferred for transmissions of the UE-B 714 and/or resources that are not preferred for transmissions of the UE-B 714, the UE-B 704 may select resource(s) to be used for its sidelink transmission resource selection, or resource re-selection, may be based on both UE-B's sensing result (if available) and the received inter-UE coordination information 716 according to a first option.

In a second option, the UE-B 714 may select resource(s) to be used for its sidelink transmission resource selection, or resource re-selection, may be based on the received inter-UE coordination information 716 and not based on sensing. In a third option, the UE-B 714 may select resource(s) to be used for its sidelink transmission resource selection, or resource re-selection, may be based on the received inter-UE coordination information 716 (which may allow the UE-B to use or not use sensing in combination with the inter-UE coordination information 716).

Figure 7B:
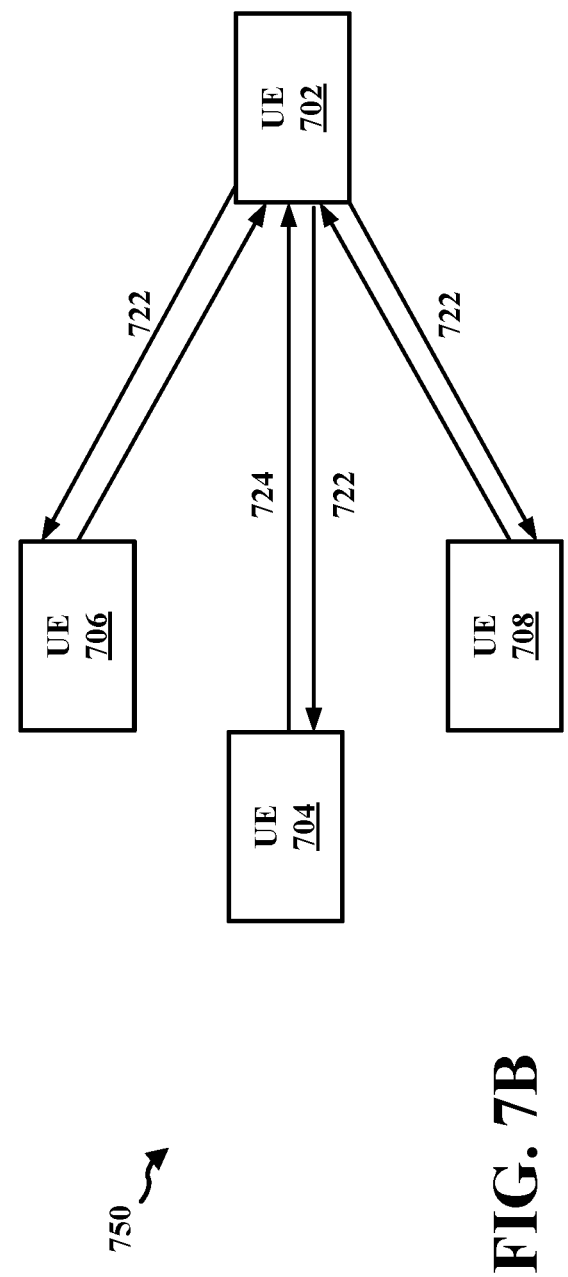

FIG. 7B is a diagram 750 illustrating the exchange of inter UE coordination information that a UE 702 may provide to multiple UEs. As illustrated in FIG. 7B, the UE 702 may be more capable of performing sensing in comparison with the UE 704, the UE 706, or the UE 708. For example, the UE 702, which may be a receiving UE that receives a transmission from the UE 704, the UE 706, or the UE 708) may have a higher processing power and/or higher battery capacity than the UE 704, the UE 706, or the UE 708. Therefore, it may be more efficient for the higher battery capacity/processing power UE 702 to perform sensing and transmit (e.g., groupcast) resource availability information 722 to the UE 704, the UE 706, and the UE 708. Moreover, the UE 702 may have information about the UE 704, the UE 706, and the UE 708 based on measuring RSRP of signals on incoming links. For example, the UE 702 may be able to measure RSRP on a link between the UE 702 and the UE 704, a link between the UE 702 and the UE 706, and a link between the UE 702 and the UE 708. By measuring the different links, the UE 702 may be able to better identify resources that are available.

In some circumstances, based on the sensing, the receiving UE 702 may identify a first set of available resources that may be smaller than a threshold amount of resources (e.g., determined to be unsuitably small by comparing a size of the available resources with an availability threshold) for the transmission 724 from the UE 704 to the UE 702. Aspects provided herein enable a receiving UE to re-evaluate a set of available resources that may be suitable for a sidelink transmission by adjusting a measurement threshold, resulting in more consistent amount of available resources identified in inter-UE coordination information.

Figure 8:
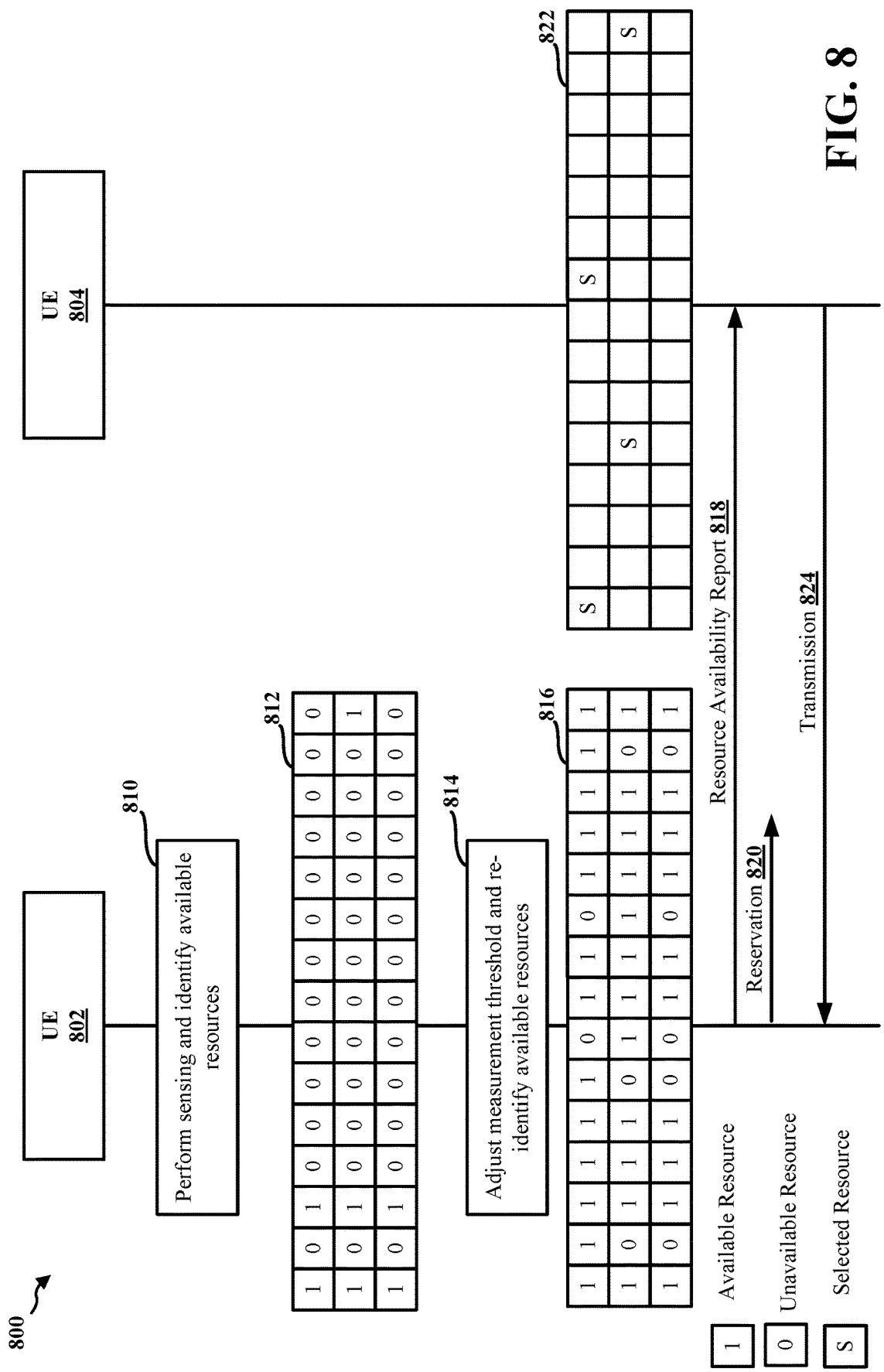
FIG. 8 is a diagram illustrating communication flow between UEs, in accordance with the teachings disclosed herein.

FIG. 8 is an example diagram 800 illustrating a communication flow between UEs including the transmission of inter-UE coordination information, in accordance with the aspects presented herein. Both the UE 802 and the UE 804 in FIG. 8 may be operating under sidelink resource allocation Mode 2. The UE 802 in FIG. 8 may correspond with the UE-A 712 in FIG. 7A and/or the UE 702 in FIG. 7B and the UE 804 in FIG. 8 may correspond with the UE-B 714 in FIG. 7A and/or the UE 704 in FIG. 7B. In some aspects, the UE 802 may have a higher processing power and/or a higher battery capacity than the UE 804. The UE 802 may perform sensing (e.g., as described in connection with FIGS. 5 and 6) to identify resources that are available for the UE 804, at 810. In some aspects, the UE 802 may generate a resource availability report 812 that the UE 802 transmits to other UEs. A resource availability report may refer to a set of information representing availability of each of one or more resources. As one example, each "0" represented in the resource availability report 812 may indicate that a resource mapped to the "0" is unavailable for the UE 804 and each "1" represented in the resource availability report 812 may indicate that a resource mapped to the "1" is available for the UE 804. Although the example is illustrated for a single UE receiving the availability report 812, which may occur as a unicast, the UE 802 may similarly broadcast or groupcast the availability report 812 to multiple UEs, in some aspects. As part of the sensing, at 810, the UE 802 may perform one or more sensing measurements, such as SIR measurements, RSRP measurements, RSRQ measurements, or the like. The UE 802 may compare a result of the sensing measurement on each of the resources to a measurement threshold. In some aspects, if the result of the sensing measurement on the resource is below than the measurement threshold, the UE 802 may determine that resource to be available for UE 804. If the result of the sensing measurement on the resource is not below the measurement threshold, the UE 802 may determine that resource to be unavailable for UE 804. In some aspects, if the result of the sensing measurement on the resource is above than the measurement threshold, the UE 802 may determine that resource to be available for UE 804. If the result of the sensing measurement on the resource is not above the measurement threshold, the UE 802 may determine that resource to be unavailable for UE 804.

In some aspects, the measurement threshold may be associated with (e.g., may be a function of) one or more priorities of a packet associated with an associated transmission (such as the transmission 824) of the UE 804. In some aspects, the measurement threshold may be associated with (e.g., may be a function of) one or more modulation and coding scheme (MCS) associated with the UE 804.

In some aspects, the UE 802 may determine that the identified available resources identified at 810 (such as the resources indicated as available in the resource availability report 812) may be unsuitably small for the UE 804. For example, the UE 802 may determine that the identified available resources identified at 810 may be unsuitably small for the UE 804 by comparing a size of the available resources to an availability threshold. In some aspects, the size of the available resources and the availability threshold may be defined in terms of a total number of resources. In some aspects, the size of the available resources and the availability threshold may be defined in terms of a percentage compared with the resources that are being sensed. For example, the availability threshold may be 50%, and the UE 802 may determine the size of the available resources to be unsuitably small for UE 804 if the available resources are below 50% of the total amount of resources in the resource selection window. Upon determining the size of the available resources to be unsuitably small, the UE 802 may, at 814, adjust a measurement threshold and re-identify available resources based on the adjusted measurement threshold. For example, the UE 802 may decrease a SIR threshold by a number of decibels (dBs), and then re-identify available resources based on the new SIR threshold by comparing SIR associated with the resources with the new SIR threshold. For each resource, if the SIR associated with the resource is above the SIR threshold, the resource may be determined by the UE 802 to be available for the UE 804. In some aspects, the UE 802 may keep adjusting the measurement threshold and re-identify available resources based on the adjusted measurement threshold until a maximum allowed/minimum allowed measurement threshold is reached, or until the amount of available resources reach the availability threshold. As one example, the UE 802 may generate a resource availability report 816. In some aspects, each "0" in the resource availability report 816 may indicate that a resource mapped to the "0" is unavailable for the UE 804 and each "1" in the resource availability report 816 may indicate that a resource mapped to the "1" is available for the UE 804. As illustrated in FIG. 8, a size of the resources indicated as available in the resource availability report 816 may be above the availability threshold of 50% because more than 50% of the resources are available. In some aspects, the UE 802 may sort each of the available resources in a descending starting from the resource associated with a measurement furthest away from the measurement threshold. For example, the UE may sort all resources that have higher SIR than the SIR threshold in descending order of SIR level.

In some aspects, the UE 802 may provide a resource availability report 818 to the UE 804. In some aspects, the resource availability report 818 may include the resource availability report 816. In some aspects, the resource availability report 818 may include a report that sorts top X % available resources in a descending starting from the resource associated with a measurement furthest away from the measurement threshold. In some aspects, X may be defined based on an availability threshold or a different threshold. The UE may adjust the measurement threshold until a report that X % of available resources may be identified or until a maximum allowed/minimum allowed measurement threshold is reached.

In some aspects, the UE 802 may also schedule one or more resources for the UE 804 by transmitting a resource reservation 820 to one or more UEs. In some aspects, the UE 802 may not schedule the one or more resources for the UE 804. In some aspects, upon receiving the resource availability report 818, the UE 804 may select one or more resources that are indicated as available in the resource availability report 818 for a transmission 824 to the UE 802. In some aspects, as illustrated in 822 of FIG. 8, the UE 804 may select (denoted by "S") one or more resources indicated as being available in the resource availability report 818. The UE 804 may use the one or more selected resources to transmit the transmission 824 to the UE 802.

Figure 9:
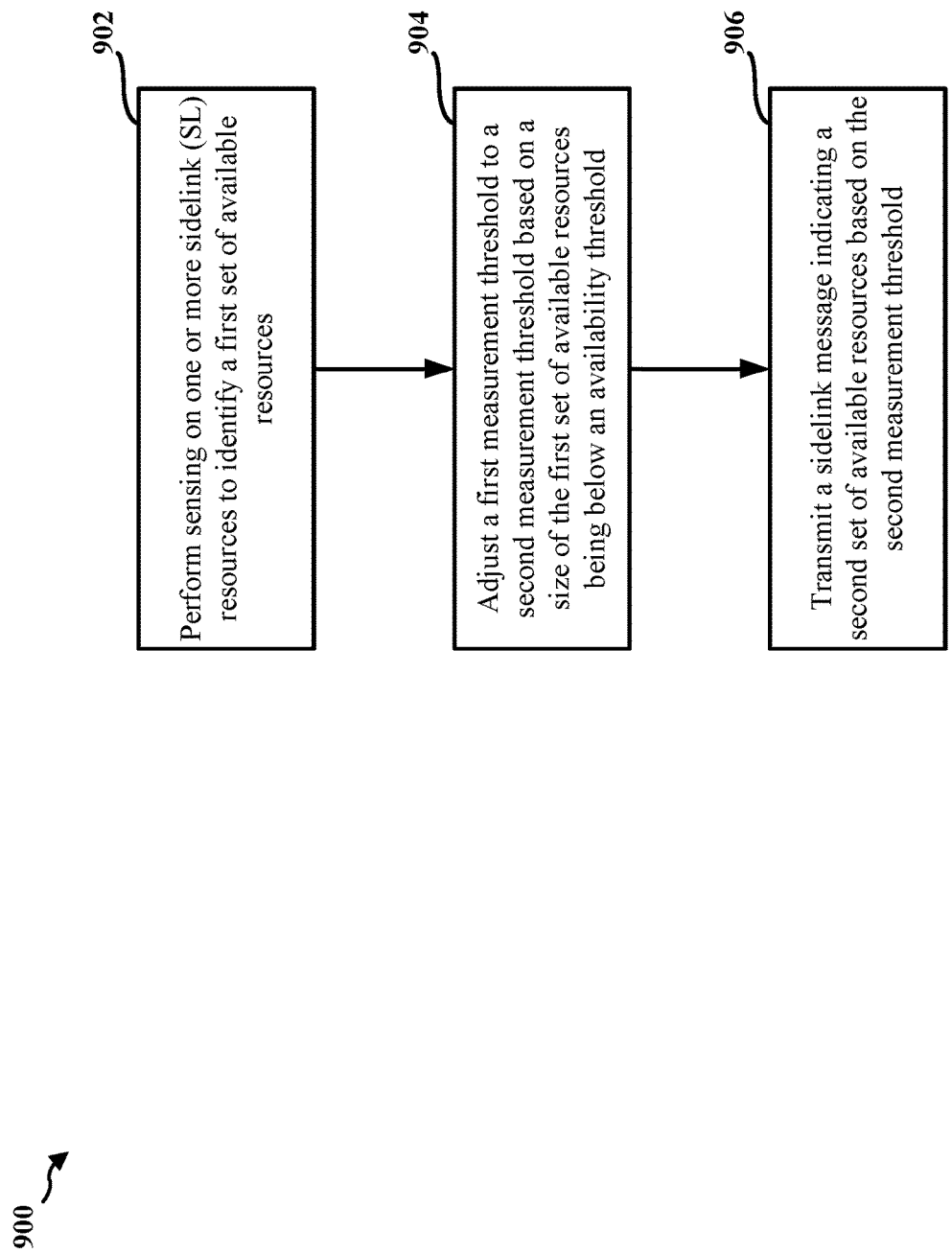
FIG. 9 is a flowchart of a method of wireless communication at a first UE, in accordance with the teachings disclosed herein.

FIG. 9 is a flowchart 900 of a method of wireless communication. The method may be performed by a UE (e.g., the UE 104, the UE 702, the UE 802; the apparatus 1302). The method may enable a receiving UE to re-identify a first set of available resources that may be suitable for the transmission of the transmitting UE by adjusting a measurement threshold, resulting in more efficient sidelink transmissions.

At 902, the UE may perform sensing on one or more SL resources to identify a first set of available resources. For example, the UE 802 may perform sensing on one or more SL resources to identify a first set of available resources at 810. In some aspects, 902 may be performed by sensing component 1342 in FIG. 13.

At 904, the UE may adjust a first measurement threshold to a second measurement threshold based on a size of the first set of available resources being below an availability threshold. For example, the UE 802 may adjust a first measurement threshold to a second measurement threshold based on a size of the first set of available resources being below an availability threshold at 814. In some aspects, 904 may be performed by availability component 1344 in FIG. 13. For example, the size may be defined based on a percentage relative to the one or more SL resources. As one example, if 50% of resources are available in the one or more SL resources, the size of the first set of available resources may be 50%.

At 906, the UE may transmit a sidelink message indicating a second set of available resources based on the second measurement threshold. For example, the UE 802 may transmit a sidelink message indicating a second set of available resources (e.g., the resource availability report 818) that are available based on the second measurement threshold. In some aspects, 906 may be performed by SL component 1346 in FIG. 13.

Figure 10:
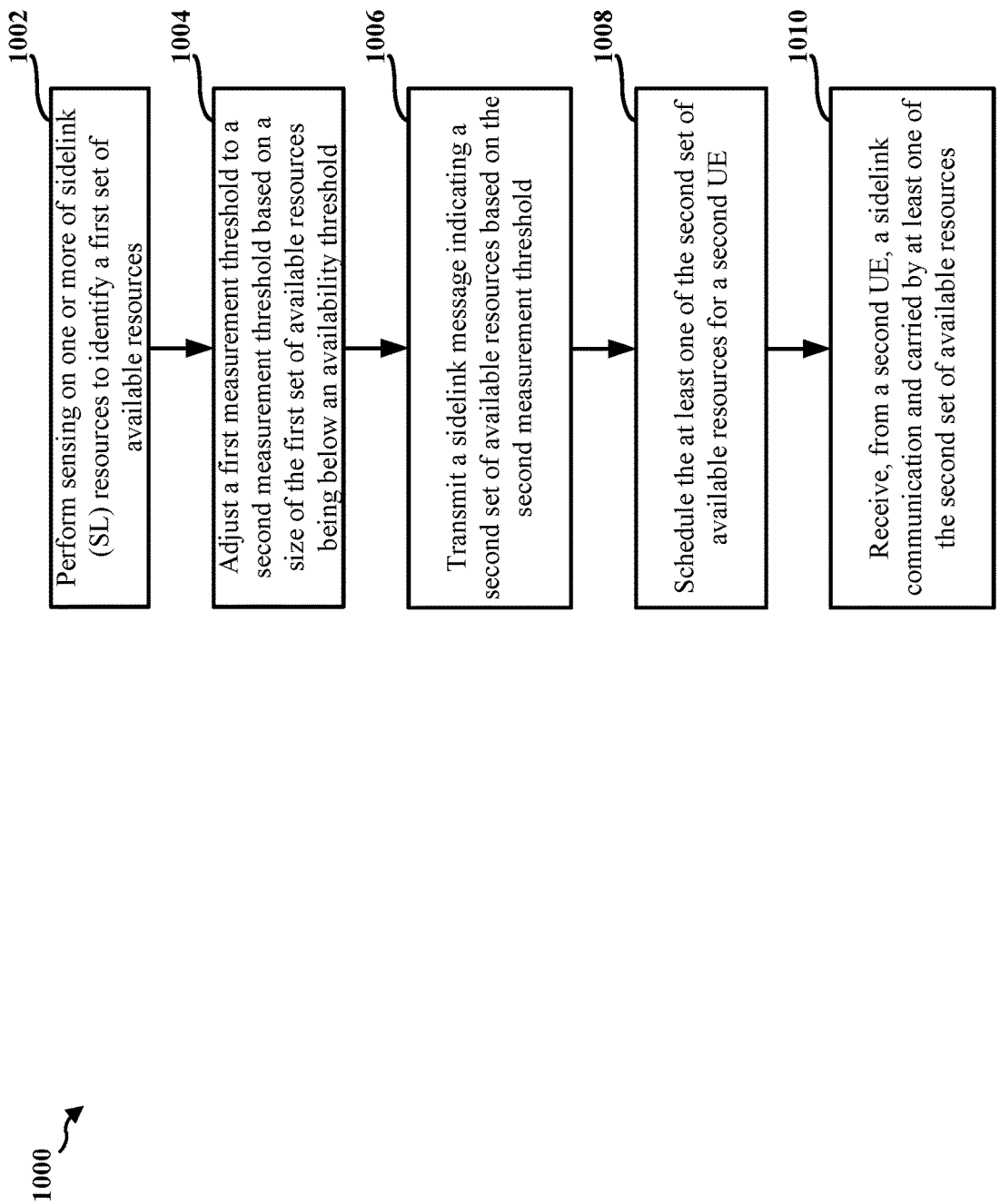
FIG. 10 is a flowchart of a method of wireless communication at a first UE, in accordance with the teachings disclosed herein.

FIG. 10 is a flowchart 1000 of a method of wireless communication. The method may be performed by a UE (e.g., the UE 104, the UE 702, the UE 802; the apparatus 1302). The method may enable a receiving UE to re-identify a first set of available resources that may be suitable for the transmission of the transmitting UE by adjusting a measurement threshold, resulting in more efficient sidelink transmissions.

At 1002, the UE may perform sensing on one or more SL resources to identify a first set of available resources. For example, the UE 802 may perform sensing on one or more SL resources to identify a first set of available resources at 810. In some aspects, 1002 may be performed by sensing component 1342 in FIG. 13.

At 1004, the UE may adjust a first measurement threshold to a second measurement threshold based on a size of the first set of available resources being below an availability threshold. For example, the UE 802 may adjust a first measurement threshold to a second measurement threshold based on a size of the first set of available resources being below an availability threshold at 814. In some aspects, 1004 may be performed by availability component 1344 in FIG. 13. In some aspects, the availability threshold may include a percentage of available resources from the one or more SL resources. For example, the size may be defined based on a percentage relative to the one or more SL resources. As one example, if 50% of resources are available in the one or more SL resources, the size of the first set of available resources may be 50%. In some aspects, the availability threshold may include a size of available resources from the one or more SL resources. In some aspects, the first measurement threshold is a first SIR ratio value, and the measurement second threshold is a second SIR ratio value. As one example, the first SIR ratio value may be lower or higher than the second SIR ratio value. In some aspects, the first SIR ratio value or the second SIR ratio value may be based on a function of one or more of a priority associated with a sidelink communication associated with a second UE based on the sensing or a MCS associated with the second UE. In some aspects, the first measurement threshold may be a first RSRQ threshold, and the second measurement threshold may be a second RSRQ threshold. The first RSRQ threshold may be lower or higher than the second RSRQ threshold. In some aspects, the second measurement threshold may be based on one or more of: a packet priority associated with a sidelink communication associated with a second UE, a MCS associated with the second UE, a cast type associated with the second UE, a remaining packet delay budget associated with the sidelink communication associated with the second UE, a communication range specification associated with the second UE, a HARQ ACK utilization status associated with the sidelink communication associated with the second UE, a channel busy ratio (CBR), or a distance between the UE and the second UE.

At 1006, the UE may transmit a sidelink message indicating a second set of available resources based on the second measurement threshold. For example, the UE 802 may transmit a sidelink message indicating a second set of available resources (e.g., the resource availability report 818) that are available based on the second measurement threshold. In some aspects, 1006 may be performed by SL component 1346 in FIG. 13. In some aspects, the second set of resources may be indicated in a resource availability report including a list of each resource in the second set of available resources based on the sensing. In some aspects, the second set of resources is indicated in a resource availability report including a top percentage of available resources based on the second measurement threshold.

In some aspects, at 1008, the UE may schedule at least one available resource of the second set of available resources for a second UE. For example, the UE 802 may schedule at least one available resource of the second set of available resources for a second UE 804 by transmitting a reservation 820. The at least one available resource of the second set of available resources for a second UE may be used by the second UE to transmit a transmission to the UE, such as the transmission 824. In some aspects, the UE may not schedule the at least one available resource of the second set of available resources for the second UE. In some aspects, 1008 may be performed by SL component 1346 in FIG. 13.

In some aspects, at 1010, the UE may receive, from a second UE, a sidelink communication based on the sensing and carried by at least one available resource of the second set of available resources. For example, the UE 802 may receive, from a second UE 804, a sidelink communication (e.g., the transmission 824) based on the sensing and carried by at least one available resource of the second set of available resources.

Figure 11:
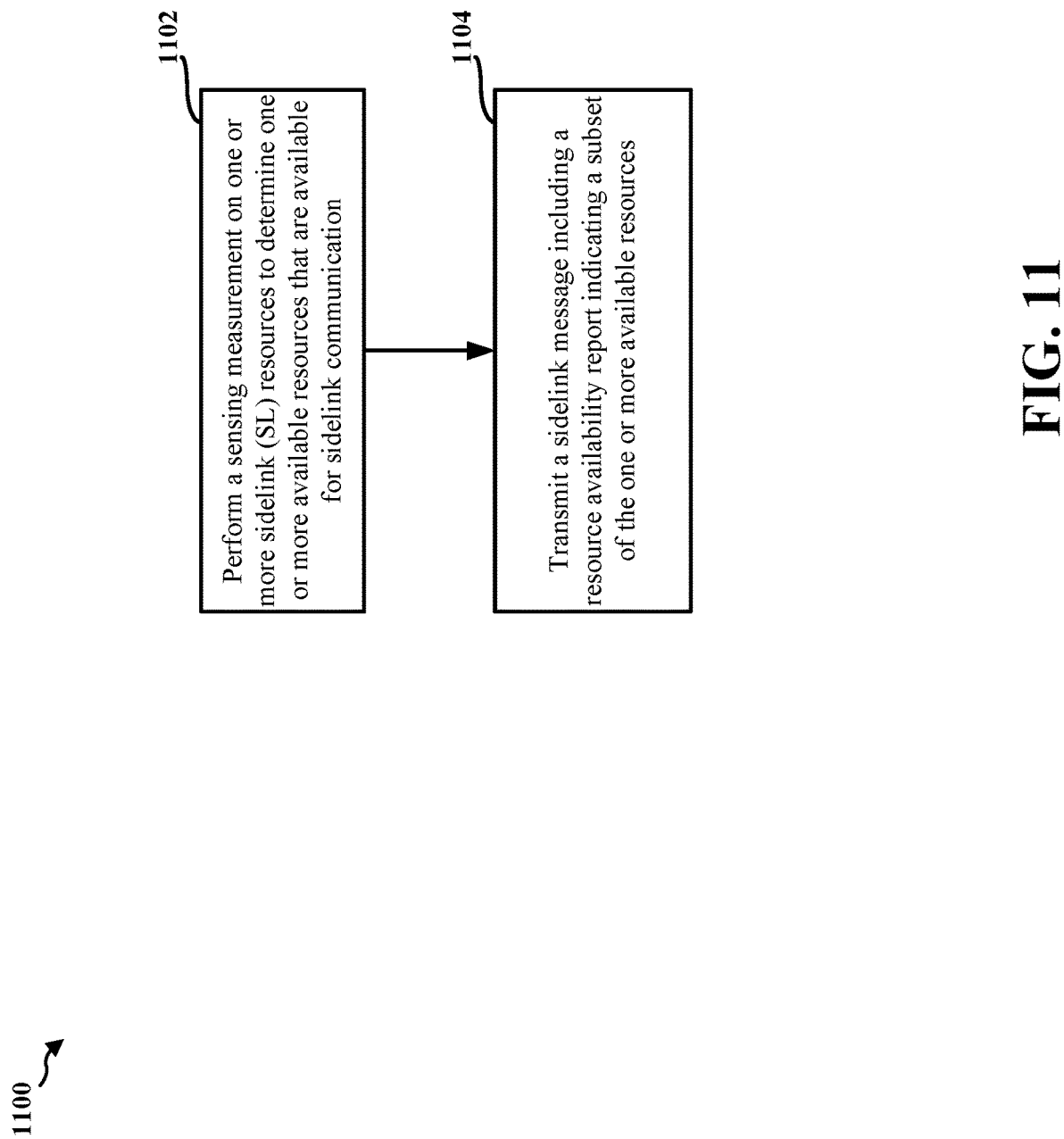
FIG. 11 is a flowchart of a method of wireless communication at a first UE, in accordance with the teachings disclosed herein.

FIG. 11 is a flowchart 1100 of a method of wireless communication. The method may be performed by a UE (e.g., the UE 104, the UE 702, the UE 802; the apparatus 1302). The method may enable a receiving UE to re-identify a first set of available resources that may be suitable for the transmission of the transmitting UE by adjusting a measurement threshold, resulting in more efficient sidelink transmissions.

At 1102, the UE may perform a sensing measurement on one or more SL resources to determine one or more available resources for sidelink communication. For example, the UE 802 may perform a sensing measurement on one or more SL resources to determine one or more available resources for sidelink communication at 810. In some aspects, 1102 may be performed by sensing component 1342 in FIG. 13.

At 1104, the UE may transmit a sidelink message including a resource availability report indicating a subset of the one or more available resources. For example, the UE 802 may transmit a sidelink message including a resource availability report indicating a subset of the one or more available resources (e.g., the resource availability report 818). In some aspects, 1104 may be performed by SL component 1346 in FIG. 13.

Figure 12:
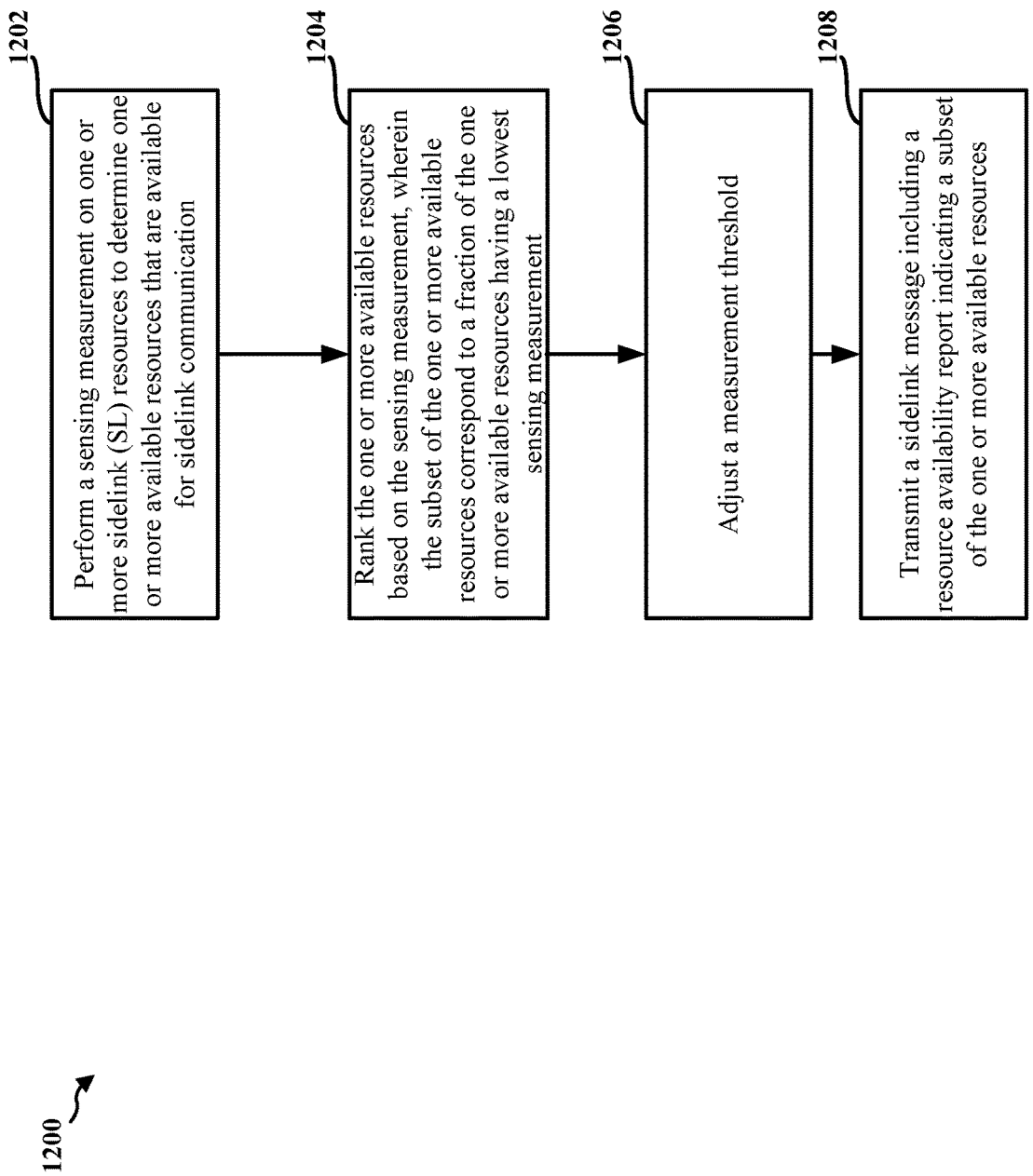
FIG. 12 is a flowchart of a method of wireless communication at a first UE, in accordance with the teachings disclosed herein.

FIG. 12 is a flowchart 1200 of a method of wireless communication. The method may be performed by a UE (e.g., the UE 104, the UE 702, the UE 802; the apparatus 1302). The method may enable a receiving UE to re-identify a first set of available resources that may be suitable for the transmission of the transmitting UE by adjusting a measurement threshold, resulting in more efficient sidelink transmissions.

At 1202, the UE may perform a sensing measurement on one or more SL resources to determine one or more available resources for sidelink communication. For example, the UE 802 may perform a sensing measurement on one or more SL resources to determine one or more available resources for sidelink communication at 810. In some aspects, 1202 may be performed by sensing component 1342 in FIG. 13.

At 1204, the UE may rank the one or more available resources based on the sensing measurement. The subset of the one or more available resources may correspond to a fraction of the one or more available resources having a lowest or highest sensing measurement. For example, the UE 802 may rank the one or more available resources based on the sensing measurement. In some aspects, 1204 may be performed by availability component 1344 in FIG. 13.

At 1206, the UE may adjust a threshold for the sensing measurement based on a first set of available resources being below an availability threshold and further based on one or more of: a packet priority associated with a sidelink communication associated with a second UE, a MCS associated with the second UE, a cast type associated with the second UE, a remaining packet delay budget associated with the sidelink communication associated with the second UE, a communication range specification associated with the second UE, a HARQ ACK utilization status associated with the sidelink communication associated with the second UE, a CBR, or a distance between the UE and the second UE. For example, the UE 802 may adjust a measurement threshold at 814. In some aspects, 1206 may be performed by availability component 1344 in FIG. 13.

At 1208, the UE may transmit a sidelink message including a resource availability report indicating a subset of the one or more available resources. For example, the UE 802 may transmit a sidelink message including a resource availability report indicating a subset of the one or more available resources (e.g., the resource availability report 818). In some aspects, 1208 may be performed by SL component 1346 in FIG. 13. In some aspects, the subset corresponds to a percentage value of the one or more available resources of the one or more SL resources. In some aspects, the resource availability report indicates a ranking of each resource in the subset of the one or more available resources.

Figure 13:
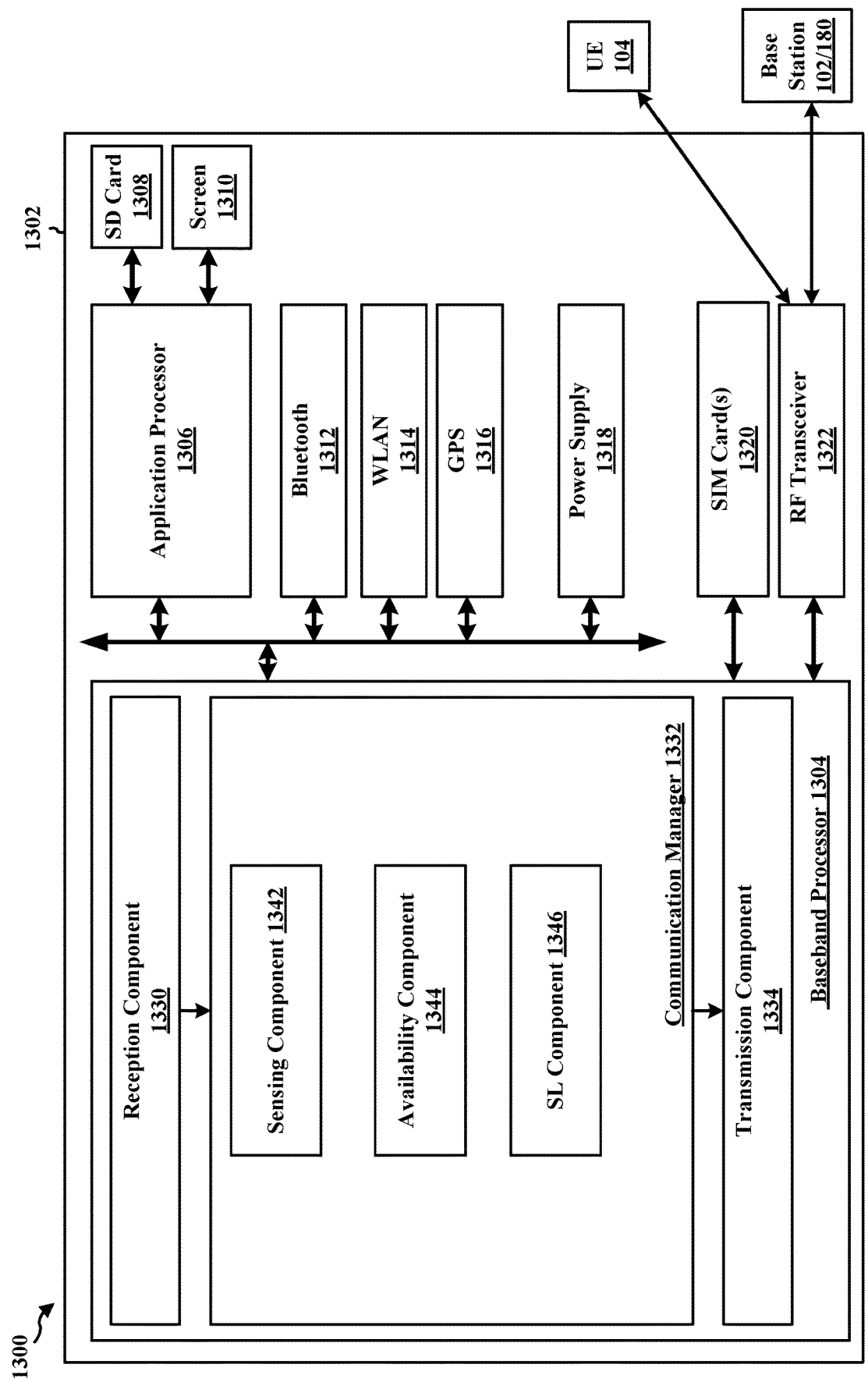
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 may be a UE, a component of a UE, or may implement UE functionality. In some aspects, the apparatus 1302 may include a cellular baseband processor 1304 (also referred to as a modem) coupled to a cellular RF transceiver 1322. In some aspects, the apparatus 1302 may further include one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, or a power supply 1318. The cellular baseband processor 1304 communicates through the cellular RF transceiver 1322 with the UE 104 and/or BS 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the UE 350 and may include the memory 360 and/or at least one of the TX processor 368, the RX processor 356, and the controller/processor 359. In one configuration, the apparatus 1302 may be a modem chip and include just the baseband processor 1304, and in another configuration, the apparatus 1302 may be the entire UE (e.g., see 350 of FIG. 3) and include the additional modules of the apparatus 1302.

The communication manager 1332 may include a sensing component 1342 that is configured to perform sensing on one or more SL resources to identify a first set of available resources or perform a sensing measurement on one or more SL resources to determine one or more available resources for sidelink communication, e.g., as described in connection with 902 in FIG. 9, 1002 in FIG. 10, 1102 in FIG. 11, or 1202 in FIG. 12.

The communication manager 1332 may further include an availability component 1344 that may be configured to adjust a first measurement threshold to a second measurement threshold based on a size of the first set of available resources being below an availability threshold, rank the one or more available resources based on the sensing measurement, or adjust a measurement threshold, e.g., as described in connection with 904 in FIG. 9, 1004 in FIG. 10, or 1204 and 1206 in FIG. 12.

The communication manager 1332 may further include an SL component 1346 that may be configured to transmit a sidelink message indicating a second set of available resources based on the second measurement threshold, schedule the at least one available resource of the second set of available resources for a second UE, receive, from a second UE, a sidelink communication based on the sensing and carried by at least one available resource of the second set of available resources, or transmit a sidelink message including a resource availability report indicating a subset of the one or more available resources, e.g., as described in connection with 906 in FIG. 9, 1006, 1008 or 1010 in FIG. 10, 1104 in FIG. 11, or 1208 in FIG. 12.

The apparatus may include additional components that perform each of the blocks of the algorithm in the flowcharts of FIGS. 9-12. As such, each block in the flowcharts of FIGS. 9-12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the cellular baseband processor 1304, may include means for performing sensing on one or more of SL resources to identify a set of available resources, such as the sensing component 1342 or a transceiver. The cellular baseband processor 1304 may further include means for increasing a first measurement threshold to a second measurement threshold based on a size of the first set of available resources being below an availability threshold, such as the availability component 1344. The cellular baseband processor 1304 may further include means for transmitting a sidelink message indicating a second set of available resources based on the second measurement threshold, such as the SL component 1346 or a transceiver. The cellular baseband processor 1304 may further include means for receiving, from a second UE, a sidelink communication based on the sensing and carried by at least one available resource of the second set of available resources, such as the SL component 1346 or a transceiver. The cellular baseband processor 1304 may further include means for scheduling the at least one available resource of the second set of available resources for a second UE, such as the SL component 1346 or a transceiver. The cellular baseband processor 1304 may further include means for performing a sensing measurement on one or more SL resources to determine one or more available resources for sidelink communication, such as the sensing component 1342 or a transceiver. The cellular baseband processor 1304 may further include means for ranking the one or more available resources based on the sensing measurement, such as the availability component 1344. The cellular baseband processor 1304 may further include means for adjusting a measurement threshold, such as the availability component 1344. The cellular baseband processor 1304 may further include means for transmitting a sidelink message including a resource availability report indicating a subset of the one or more available resources, such as the SL component 1346 or a transceiver. The means may be one or more of the components of the apparatus 1302 configured to perform the functions recited by the means. As described supra, the apparatus 1302 may include the TX Processor 368, the RX Processor 356, and the controller/processor 359. As such, in one configuration, the means may be the TX Processor 368, the RX Processor 356, and the controller/processor 359 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE, comprising: a memory; and at least one processor coupled to the memory, the memory and the at least one processor configured to: perform sensing on one or more SL resources to identify a first set of available resources; adjust a first measurement threshold to a second measurement threshold based on a size of the first set of available resources being below an availability threshold; and transmit a sidelink message indicating a second set of available resources based on the second measurement threshold.

Aspect 2 is the apparatus of aspect 1, wherein the at least one processor and the memory are further configured to: receive, from a second UE, a sidelink communication and carried by at least one available resource of the second set of available resources.

Aspect 3 is the apparatus of any of aspects 1-2, wherein the at least one processor coupled to the memory are further configured to: schedule the at least one available resource of the second set of available resources for the second UE.

Aspect 4 is the apparatus of any of aspects 1-3, wherein the first measurement threshold is a first SIR ratio value, and wherein the second measurement threshold is a second SIR ratio value, the first SIR ratio value being higher than the second SIR ratio value.

Aspect 5 is the apparatus of any of aspects 1-4, wherein the first SIR ratio value or the second SIR ratio value is based on a function of one or more of: a priority associated with a sidelink communication associated with a second UE or a MCS associated with the second UE.

Aspect 6 is the apparatus of any of aspects 1-5, wherein the first measurement threshold is a first RSRQ threshold, and wherein the second measurement threshold is a second RSRQ threshold, the first RSRQ threshold being higher than the second RSRQ threshold.

Aspect 7 is the apparatus of any of aspects 1-6, wherein the availability threshold comprises a percentage of available resources from the one or more SL resources.

Aspect 8 is the apparatus of any of aspects 1-7, wherein the availability threshold comprises a threshold size of available resources from the one or more SL resources.

Aspect 9 is the apparatus of any of aspects 1-8, wherein the second set of available resources is indicated in a resource availability report comprising a list of each resource in the second set of available resources.

Aspect 10 is the apparatus of any of aspects 1-9, wherein the second set of available resources is indicated in a resource availability report comprising a top percentage of available resources based on the second measurement threshold.

Aspect 11 is the apparatus of any of aspects 1-10, wherein the second measurement threshold is based on one or more of: a packet priority associated with a sidelink communication associated with a second UE, a MCS associated with the second UE, a cast type associated with the second UE, a remaining packet delay budget associated with the sidelink communication associated with the second UE, a communication range specification associated with the second UE, a HARQ ACK utilization status associated with the sidelink communication associated with the second UE, a CBR, or a distance between the first UE and the second UE.

Aspect 12 is the apparatus of any of aspects 1-11, further comprising an antenna coupled to the at least one processor.

Aspect 13 is an apparatus for wireless communication at a first UE, comprising: a memory; and at least one processor coupled to the memory and configured to: perform a sensing measurement on one or more SL resources to determine one or more available resources for sidelink communication; and transmit a sidelink message including a resource availability report indicating a subset of the one or more available resources.

Aspect 14 is the apparatus of aspect 13, wherein the subset corresponds to a percentage value of the one or more available resources of the one or more SL resources.

Aspect 15 is the apparatus of any of aspects 13-14, wherein the at least one processor and the memory are further configured to: rank the one or more available resources based on the sensing measurement, wherein the subset of the one or more available resources correspond to a fraction of the one or more available resources having a lowest sensing measurement.

Aspect 16 is the apparatus of any of aspects 13-15, wherein the resource availability report indicates a ranking of each resource in the subset of the one or more available resources.

Aspect 17 is the apparatus of any of aspects 13-16, wherein the at least one processor coupled to the memory are further configured to: adjust a threshold for the sensing measurement based on a first set of available resources being below an availability threshold and further based on one or more of: a packet priority associated with the sidelink communication associated with a second UE, a MCS associated with the second UE, a cast type associated with the second UE, a remaining packet delay budget associated with the sidelink communication associated with the second UE, a communication range specification associated with the second UE, a HARQ ACK utilization status associated with the sidelink communication associated with the second UE, a CBR, or a distance between the first UE and the second UE.

Aspect 18 is the apparatus of any of aspects 13-17, further comprising an antenna coupled to the at least one processor.

Aspect 19 is a method of wireless communication for implementing any of aspects 1 to 12.

Aspect 20 is an apparatus for wireless communication including means for implementing any of aspects 1 to 12.

Aspect 21 is a computer-readable medium storing computer executable code, where the code when executed by a processor causes the processor to implement any of aspects 1 to 12.

Aspect 22 is a method of wireless communication for implementing any of aspects 13 to 18.

Aspect 23 is an apparatus for wireless communication including means for implementing any of aspects 13 to 18.

Aspect 24 is a computer-readable medium storing computer executable code, where the code when executed by a processor causes the processor to implement any of aspects 13 to 18.

What is claimed is:

1. An apparatus for wireless communication at a first user equipment (UE), comprising:
   memory; and
   one or more processors coupled to the memory and configured to cause the first UE to:
      perform sensing on one or more sidelink (SL) resources to identify a first set of one or more preferred resources or a first set of one or more non-preferred resources for a transmission from a second UE;
      adjust a first measurement threshold to a second measurement threshold based on a size of a first set of available resources that is below an availability threshold, the size of the first set of available resources associated with the first set of one or more preferred resources or the first set of one or more non-preferred resources for the transmission from the second UE; and
      transmit, to the second UE, inter-UE coordination information that indicates a second set of one or more preferred resources or a second set of one or more non-preferred resources based on the second measurement threshold, wherein the second set of one or more preferred resourcesor the second set of oneor more non-preferred resources indicates at least one preferred resource for the transmission from the second UE or indicates at least one non-preferred resource for the transmission from the second UE.

2. The apparatus of claim 1, wherein the one or more processors are further configured to cause the first UE to:
   receive, from the second UE, a sidelink communication carriedby the at least one preferred resource.

3. The apparatus of claim 2, wherein the one or more processors are further configured to cause the first UE to:
   schedule the at least one preferred resource for the second UE.

4. The apparatus of claim 1, wherein the first measurement threshold is a first signal to interference (SIR) ratio value, wherein the second measurement threshold is a second SIR ratio value, and wherein the first SIR ratio value is higher than the second SIR ratio value.

5. The apparatus of claim 4, wherein the first SIR ratio value or the second SIR ratio value is based on a function of one or more of: a priority associated with a sidelink communication associated with the second UE or a modulation and coding scheme (MCS) associated with the second UE.

6. The apparatus of claim 1, wherein the first measurement threshold is a first reference signal received quality (RSRQ) threshold, wherein the second measurement threshold is a second RSRQ threshold, and wherein the first RSRQ threshold is higher than the second RSRQ threshold.

7. The apparatus of claim 1, wherein the availability threshold comprises a percentage of available resources from the one or more SL resources.

8. The apparatus of claim 1, wherein the availability threshold comprises a threshold size of available resources from the one or more SL resources.

9. The apparatus of claim 1, wherein the second set of one or more preferred resources is indicated in a resource availability report that comprises a list of each resource in the second set of one or more preferred resources.

10. The apparatus of claim 1, wherein the second set of one or more preferred resources is indicated in a resource availability report that comprises a top percentage of preferred resources based on the second measurement threshold.

11. The apparatus of claim 1, further comprising one or more antennas coupled to the one or more processors, and wherein the second measurement threshold is based on one or more of:
- a packet priority associated with a sidelink communication associated with the second UE,
- a modulation and coding scheme (MCS) associated with the second UE,
- a cast type associated with the second UE, a remaining-packet delay budget associated with the sidelink communication associated with the second UE,
- a communication range specification associated with the second UE,
- a hybrid automatic repeat request (HARQ) acknowledgment (ACK) utilization status associated with the sidelink communication associated with the second UE,
- a channel busy ratio (CBR), or
- a distance between the first UE and the second UE.

12. The apparatus of claim 11, wherein the second measurement threshold is based on the packet priority associated with the sidelink communication associated with the second UE.

13. The apparatus of claim 11, wherein the second measurement threshold is based on the MCS associated with the second UE.

14. The apparatus of claim 11, wherein the second measurement threshold is based on the cast type associated with the second UE.

15. The apparatus of claim 11, wherein the second measurement threshold is based on the remaining packet delay budget associated with the sidelink communication associated with the second UE.

16. The apparatus of claim 11, wherein the second measurement threshold is based on the communication range specification associated with the second UE.

17. The apparatus of claim 11, wherein the second measurement threshold is based on the HARQ ACK utilization status associated with the sidelink communication associated with the second UE.

18. The apparatus of claim 11, wherein the second measurement threshold is based on the CBR.

19. The apparatus of claim 11, wherein the second measurement threshold is based on the distance between the first UE and the second UE.

20. The apparatus of claim 1, wherein the inter-UE coordination information indicates the second set of one or more preferred resources, wherein the second set of one or more preferred resources includes a second set of available resources.

21. The apparatus of claim 1, wherein the one or more processors are coupled to a transceiver and individually or in combination configured to cause the first UE to perform the sensing on the one or more SL resources, adjust the first measurement threshold to the second measurement threshold based on the size of the first set of available resources that is below the availability threshold, and transmit the inter-UE coordination information that indicates a second set of available resources.

22. The apparatus of claim 1, wherein the one or more processors are configured to cause the first UE to:
increase the first measurement threshold to the second measurement threshold.

23. The apparatus of claim 1, wherein the first measurement threshold and the second measurement threshold are for a reference signal received power (RSRP) measurement.

24. The apparatus of claim 1, wherein to adjust the first measurement threshold to the second measurement threshold, the one or more processors are configured to cause the first UE to adjust the first measurement threshold to the second measurement threshold based on the size of the first set of available resources associated with the first set of one or more preferred resources that is below the availability threshold.

25. The apparatus of claim 1, wherein to adjust the first measurement threshold to the second measurement threshold, the one or more processors are configured to cause the first UE to adjust the first measurement threshold to the second measurement threshold based on the size of the first set of available resources associated with the first set of one or more non-preferred resources that is below the availability threshold.

26. The apparatus of claim 1,
wherein to perform the sensing, the one or more processors are configured to cause the first UE to perform the sensing on the one or more SL resources to identify the first set of one or more preferred resources for the transmission from the second UE;
wherein to adjust the first measurement threshold to the second measurement threshold, the one or more processors are configured to cause the first UE to adjust the first measurement threshold to the second measurement threshold based on the size of the first set of available resources associated with the first set of one or more preferred resources that is below the availability threshold; and
wherein the inter-UE coordination information indicates the second set of one or more preferred resources, and wherein the second set of one or more preferred resources indicates the at least one preferred resource for the transmission from the second UE.

27. The apparatus of claim 1,
wherein to perform the sensing, the one or more processors are configured to cause the first UE to perform the sensing on the one or more SL resources to identify the first set of one or more non-preferred resources for the transmission from the second UE;
wherein to adjust the first measurement threshold to the second measurement threshold, the one or more processors are configured to cause the first UE to adjust the first measurement threshold to the second measurement threshold based on the size of the first set of available resources associated with the first set of one or more non-preferred resources that is below the availability threshold; and
wherein the inter-UE coordination information indicates the second set of one or more non-preferred resources, and wherein the second set of one or more non-preferred resources indicates the at least one non-preferred resource for the transmission from the second UE.

28. A method for wireless communication at a first user equipment (UE), comprising:
performing sensing on one or more sidelink (SL) resources to identify a first set of one or more preferred resources or a first set of one or more non-preferred resources for a transmission from a second UE;
adjusting a first measurement threshold to a second measurement threshold based on a size of a first set of available resources that is below an availability threshold, the size of the first set of available resources associated with the first set of one or more preferred resources or the first set of one or more non-preferred resources for the transmission from the second UE; and transmitting, to the second UE, inter-UE coordination information that indicates a second set of one or more preferred resources or a second set of one or more non-preferred resources based on the second measurement threshold, wherein the second set of one or more preferred resources or the second set of one or more non-preferred resources indicates at least one preferred resource for the transmission from the second UE or indicates at least one non-preferred resource for the transmission from the second UE.

29. The method of claim 28, further comprising:
receive, from the second UE, a sidelink communication carried by the at least one preferred resource.

30. The method of claim 29, further comprising:
scheduling the at least one preferred resource for the second UE.

31. The method of claim 28, wherein the first measurement threshold is a first signal to interference (SIR) ratio value, wherein the second measurement threshold is a second SIR ratio value, and wherein the first SIR ratio value is higher than the second SIR ratio value.

32. The method of claim 28, wherein the availability threshold comprises a percentage of available resources from the one or more SL resources.

33. The method of claim 28, wherein the availability threshold comprises a threshold size of available resources from the one or more SL resources.

34. The method of claim 28, wherein the second set of one or more preferred resources is indicated in a resource availability report comprising a list of each resource in the second set of one or more preferred resources.

35. The method of claim 28, wherein the second set of one or more preferred resources is indicated in a resource availability report comprising a top percentage of preferred resources based on the second measurement threshold.

36. The method of claim 28, wherein the second measurement threshold is based on one or more of: a packet priority associated with a sidelink communication associated with the second UE, a modulation and coding scheme (MCS) associated with the second UE, a cast type associated with the second UE, a remaining packet delay budget associated with the sidelink communication associated with the second UE, a communication range specification associated with the second UE, a hybrid automatic repeat request (HARQ) acknowledgment (ACK) utilization status associated with the sidelink communication associated with the second UE, a channel busy ratio (CBR), or a distance between the first UE and the second UE.

37. The method of claim 36, wherein the second measurement threshold is based on the packet priority associated with the sidelink communication associated with the second UE.

38. The method of claim 36, wherein the second measurement threshold is based on the MCS associated with the second UE.

39. The method of claim 36, wherein the second measurement threshold is based on the cast type associated with the second UE.

40. The method of claim 36, wherein the second measurement threshold is based on the remaining packet delay budget associated with the sidelink communication associated with the second UE.

41. The method of claim 36, wherein the second measurement threshold is based on the communication range specification associated with the second UE.

42. The method of claim 36, wherein the second measurement threshold is based on the HARQ ACK utilization status associated with the sidelink communication associated with the second UE.

43. The method of claim 36, wherein the second measurement threshold is based on the CBR.

44. The method of claim 36, wherein the second measurement threshold is based on the distance between the first UE and the second UE.

45. The method of claim 28, wherein the inter-UE coordination information indicates the second set of one or more preferred resources, wherein the second set of one or more preferred resources includes a second set of available resources.

46. The method of claim 28, wherein adjusting the first measurement threshold to the second measurement threshold comprises increasing the first measurement threshold to the second measurement threshold.

47. The method of claim 28, wherein the first measurement threshold and the second measurement threshold are for a reference signal received power (RSRP) measurement.

48. The method of claim 28,
wherein performing the sensing includes performing the sensing on the one or more SL resources to identify the first set of one or more preferred resources for the transmission from the second UE;
wherein adjusting the first measurement threshold to the second measurement threshold includes adjusting the first measurement threshold to the second measurement threshold based on the size of the first set of available resources associated with the first set of one or more preferred resources being below the availability threshold; and
wherein the inter-UE coordination information indicates the second set of one or more preferred resources, and wherein the second set of one or more preferred resources indicates the at least one preferred resource for the transmission from the second UE.

49. The method of claim 28,
wherein performing the sensing includes performing the sensing on the one or more SL resources to identify the first set of one or more non-preferred resources for the transmission from the second UE;
wherein adjusting the first measurement threshold to the second measurement threshold includes adjusting the first measurement threshold to the second measurement threshold based on the size of the first set of available resources associated with the first set of one or more non-preferred resources being below the availability threshold; and
wherein the inter-UE coordination information indicates the second set of one or more non-preferred resources, and wherein the second set of one or more non-preferred resources indicates the at least one non-preferred resource for the transmission from the second UE.

50. An apparatus for wireless communication at a first user equipment (UE), comprising:
means for performing sensing on one or more sidelink (SL) resources to identify a first set of one or more preferred resources or a first set of one or more non-preferred resources for a transmission from a second UE;
means for adjusting a first measurement threshold to a second measurement threshold based on a size of a first set of available resources that is below an availability threshold, the size of the first set of available resources associated with the first set of one or more preferred resources or the first set of one or more non-preferred resources for the transmission from the second UE; and means for transmitting, to the second UE, inter-UE coordination information that indicates a second set of one or more preferred resources or a second set of one or more non-preferred resources based on the second measurement threshold, wherein the second set of one or more preferred resources or the second set of one or more non-preferred resources indicates at least one preferred resource for the transmission from the second UE or indicates at least one non-preferred resource for the transmission from the second UE.

51. The apparatus of claim 50, further comprising:
means for receiving, from the second UE, a sidelink communication carried by the at least one preferred resource.

52. The apparatus of claim 50, wherein the inter-UE coordination information indicates the second set of one or more preferred resources, wherein the second set of one or more preferred resources includes a second set of available resources.

53. The apparatus of claim 50,
wherein the means for performing the sensing includes means for performing the sensing on the one or more SL resources to identify the first set of one or more preferred resources for the transmission from the second UE;
wherein the means for adjusting the first measurement threshold to the second measurement threshold includes means for adjusting the first measurement threshold to the second measurement threshold based on the size of the first set of available resources associated with the first set of one or more preferred resources that is below the availability threshold; and
wherein the inter-UE coordination information indicates the second set of one or more preferred resources, and wherein the second set of one or more preferred resources indicates the at least one preferred resource for the transmission from the second UE.

54. The apparatus of claim 50,
wherein the means for performing the sensing includes means for performing the sensing on the one or more SL resources to identify the first set of one or more non-preferred resources for the transmission from the second UE;
wherein the means for adjusting the first measurement threshold to the second measurement threshold includes means for adjusting the first measurement threshold to the second measurement threshold based on the size of the first set of available resources associated with the first set of one or more non-preferred resources that is below the availability threshold; and
wherein the inter-UE coordination information indicates the second set of one or more non-preferred resources, and wherein the second set of one or more non-preferred resources indicates the at least one non-preferred resource for the transmission from the second UE.

55. A non-transitory computer-readable medium storing computer executable code at a user equipment (UE), the code when executed by one or more processors causes the UE to:
perform sensing on one or more sidelink (SL) resources to identify a first set of one or more preferred resources or a first set of one or more non-preferred resources for a transmission from a second UE;
adjust a first measurement threshold to a second measurement threshold based on a size of a first set of available resources that is below an availability threshold, the size of the first set of available resources associated with the first set of one or more preferred resources or the first set of one or more non-preferred resources for the transmission from the second UE; and
transmit, to the second UE, inter-UE coordination information that indicates a second set of one or more preferred resources or a second set of one or more non-preferred resources based on the second measurement threshold, wherein the second set of one or more preferred resources or the second set of one or more non-preferred resources indicates at least one preferred resource for the transmission from the second UE or indicates at least one non-preferred resource for the transmission from the second UE.

56. The non-transitory computer-readable medium of claim 55, further comprising:
receive, from the second UE, a sidelink communication carriedby the at least one preferred resource.

57. The non-transitory computer-readable medium of claim 55, wherein the inter-UE coordination information indicates the second set of one or more preferred resources, wherein the second set of one or more preferred resources includes a second set of available resources.

58. The non-transitory computer-readable medium of claim 55, wherein to adjust the first measurement threshold to the second measurement threshold, the code when executed by the one or more processors causes the UE to increase the first measurement threshold to the second measurement threshold.

59. The non-transitory computer-readable medium of claim 55, wherein the first measurement threshold and the second measurement threshold are for a reference signal received power (RSRP) measurement.

60. The non-transitory computer-readable medium of claim 55,
wherein to perform the sensing, the code when executed by the one or more processors causes the UE to perform the sensing on the one or more SL resources to identify the first set of one or more preferred resources for the transmission from the second UE;
wherein to adjust the first measurement threshold to the second measurement threshold, the code when executed by the one or more processors causes the UE to adjust the first measurement threshold to the second measurement threshold based on the size of the first set of available resources associated with the first set of one or more preferred resources that is below the availability threshold; and
wherein the inter-UE coordination information indicates the second set of one or more preferred resources, and wherein the second set of one or more preferred resources indicates the at least one preferred resource for the transmission from the second UE.

61. The non-transitory computer-readable medium of claim 55,
wherein to perform the sensing, the code when executed by the one or more processors causes the UE to perform the sensing on the one or more SL resources to identify the first set of one or more non-preferred resources for the transmission from the second UE;
wherein to adjust the first measurement threshold to the second measurement threshold, the code when executed by the one or more processors causes the UE to adjust the first measurement threshold to the second measurement threshold based on the size of the first set of available resources associated with the first set of one or more non-preferred resources that is below the availability threshold; and wherein the inter-UE coordination information indicates the second set of one or more non-preferred resources, and wherein the second set of one or more non-preferred resources indicates the at least one non-preferred resource for the transmission from the second UE.

\* \* \* \* \*